United States Patent
Banerjee et al.

(10) Patent No.: US 10,152,059 B2
(45) Date of Patent: Dec. 11, 2018

(54) SYSTEMS AND METHODS FOR LANDING A DRONE ON A MOVING BASE

(71) Applicant: QUALCOMM Incorporated, San Diego, CA (US)

(72) Inventors: Debdeep Banerjee, San Diego, CA (US); Ananthapadmanabhan Arasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 15/289,882

(22) Filed: Oct. 10, 2016

(65) Prior Publication Data

US 2018/0101173 A1 Apr. 12, 2018

(51) Int. Cl.
| | | |
|---|---|---|
| *G05D 1/00* | (2006.01) | |
| *B64C 39/02* | (2006.01) | |
| *B64F 1/00* | (2006.01) | |
| *G06T 7/00* | (2017.01) | |
| *G08G 5/04* | (2006.01) | |

(Continued)

(52) U.S. Cl.
CPC ......... *G05D 1/0094* (2013.01); *B64C 39/024* (2013.01); *B64F 1/007* (2013.01); *G05D 1/0684* (2013.01); *G06T 7/004* (2013.01); *G08G 5/045* (2013.01); *H04N 5/23248* (2013.01); *G06T 2207/10024* (2013.01)

(58) Field of Classification Search
None
See application file for complete search history.

(56) References Cited

U.S. PATENT DOCUMENTS

| | | |
|---|---|---|
| 9,056,676 B1 | 6/2015 | Wang |
| 9,448,562 B1 | 9/2016 | Sirang et al. |

(Continued)

FOREIGN PATENT DOCUMENTS

| | | |
|---|---|---|
| CN | 103226356 A | 7/2013 |
| EP | 2433867 A2 | 3/2012 |

OTHER PUBLICATIONS

Wang et al., "On Vision-Based Target Tracking and Range Estimation for Small UAVs", American Institute of Aeronautics and Astronautics, AIAA 2005-6401, AIAA Guidance, Navigation, and Control Conference and Exhibit, Aug. 15-18, 2005, San Francisco, CA (Year: 2005).*

(Continued)

*Primary Examiner* — Tamara L Weber
(74) *Attorney, Agent, or Firm* — Austin Rapp & Hardman, P.C.

(57) ABSTRACT

A drone is described. The drone includes a depth sensor configured to provide information for determining a distance between the drone and a moving base. The drone also includes a processor configured to control a computer vision tracking algorithm based on the distance, and to control drone movement based on the computer vision tracking algorithm. A vehicle is also described. The vehicle includes a depth sensor configured to provide information for determining a distance between a drone and the vehicle. The vehicle also includes a processor configured to control a computer vision tracking algorithm based on the distance and to send information for controlling drone movement based on the computer vision tracking algorithm.

26 Claims, 11 Drawing Sheets

(51) Int. Cl.
  *H04N 5/232* (2006.01)
  *G05D 1/06* (2006.01)

(56) References Cited

U.S. PATENT DOCUMENTS

| | | | |
|---|---|---|---|
| 2009/0087029 A1* | 4/2009 | Coleman | G06K 9/00208 382/103 |
| 2009/0314883 A1 | 12/2009 | Arlton et al. | |
| 2012/0261516 A1 | 10/2012 | Gilliland et al. | |
| 2014/0070052 A1 | 3/2014 | Kang | |
| 2014/0336848 A1* | 11/2014 | Saund | G08G 1/054 701/3 |
| 2014/0347475 A1* | 11/2014 | Divakaran | G06K 9/00771 348/135 |
| 2015/0234387 A1* | 8/2015 | Mullan | G05D 1/104 701/3 |
| 2016/0009413 A1 | 1/2016 | Lee et al. | |
| 2016/0070264 A1 | 3/2016 | Hu et al. | |
| 2016/0073048 A1 | 3/2016 | Howe et al. | |
| 2016/0122038 A1 | 5/2016 | Fleischman et al. | |
| 2016/0171330 A1* | 6/2016 | Mentese | G06K 9/3233 348/170 |
| 2016/0179096 A1* | 6/2016 | Bradlow | H05K 999/99 701/8 |
| 2016/0196756 A1* | 7/2016 | Prakash | B64C 39/024 701/3 |
| 2017/0064208 A1* | 3/2017 | Salimpour | H04N 5/23293 |
| 2017/0192430 A1* | 7/2017 | Yang | G05D 1/0088 |
| 2017/0302838 A1* | 10/2017 | Yang | H04N 5/2352 |

OTHER PUBLICATIONS

Rafi et al., "Autonomous Target Following by Unmanned Aerial Vehicles", Computer Vision Lab, Department of Computer Science, University of Central Florida, Orlando, FL, In Proceedings of the SPIE, May 2006 (Year: 2006).*
Dobrokhodov et al., "Vision-Based Tracking and Motion Estimation for Moving targets using Small UAVs", Proceedings of the 2006 American Control Conference, Minneapolis, Minnesota, Jun. 14-16, 2006 (Year: 2006).*
Dobrokhodiv et al., "Vision-Based Tracking and Motion Estimation for Moving Targets Using Unmanned Air Vehicles", Journal of Guidance, Control, and Dynamics, vol. 31, No. 4, Jul.-Aug. 2008 (Year: 2008).*
Gomez-Balderas et al., "Tracking a Ground Moving Target with a Quadrotor Using Switching Control", J Intel Robot Syst, 70:65-78, 2013 (Year: 2013).*
Kim et al., "A Vision-based Target Tracking Control System of a Quadrotor by using a Tablet Computer", 2013 International Conference on Unmanned Aircraft Systems (ICUAS), May 28-31, 2013, Grand Hyatt, Atlanta, GA (Year: 2013).*
Lockheed Martin, OnPoint Vision Systems, OnPointTM Onboard Vision Processing Unit Vision Suite v3.0 brochure, 2015 (Year: 2015).*
Oshana et al., "Software Engineering for Embedded Systems: Methods, Practical Techniques, and Applications", 2013 (Year: 2013).*
Brockers et al., "Computer Vision for Micro Air Vehicles", 2014, Jet Propulsion Laboratory, California Institute of Technology, Pasadena, CA, p. 83-102 (Year: 2014).*
Zufferey et al., "Fly-Inspired Visual Steering of an Ultralight Indoor Aircraft", 2005, IEEE International Conference on Robotics and Automation, Barcelona, Spain, p. 137-146 (Year: 2005).*
International Search Report and Written Opinion—PCT/US2017/049591—ISA/EPO—dated Nov. 2, 2017.

* cited by examiner

SYSTEMS AND METHODS FOR LANDING A DRONE ON A MOVING BASE

FIELD OF DISCLOSURE

The present disclosure relates generally to electronic devices. More specifically, the present disclosure relates to systems and methods for landing a drone on a moving base.

BACKGROUND

Some electronic devices (e.g., drones, robots, unmanned aerial vehicles (UAVs), aircraft, etc.) move throughout an environment. For example, a drone may maneuver through the air using propellers or jets. Users may manually control drones remotely.

Some maneuvers may be difficult to perform. For example, great care may need to be exercised when flying a drone to avoid crashing the drone. It may be particularly difficult to successfully fly a drone in a changing environment. As can be observed from this discussion, systems and methods that improve electronic device control may be beneficial.

SUMMARY

A drone is described. The drone includes a depth sensor configured to provide information for determining a distance between the drone and a moving base. The drone also includes a processor configured to control a computer vision tracking algorithm based on the distance and to control drone movement based on the computer vision tracking algorithm.

The processor may be configured to control the computer vision tracking algorithm by increasing tracking when the distance is within a distance threshold. The processor may be configured to control jitter of the computer vision tracking algorithm. The processor may be configured to control the jitter by converting an increased number of red-green-blue (RGB) frames to hue-saturation-value (HSV) frames.

The processor may be configured to control the jitter by computing a saliency score based on a model and at least a portion of a frame. The processor may also be configured to control the jitter by determining whether the frame is a valid frame for tracking based on the saliency score. The processor may further be configured to control the jitter by providing the frame to the computer vision tracking algorithm in a case that the frame is a valid frame.

The processor may be configured to perform frame smoothing on a set of frames provided to the computer vision tracking algorithm. The processor may be configured to control drone movement by controlling drone acceleration based on the computer vision tracking algorithm.

The processor may be configured to perform obstacle detection. The processor may be configured to control drone movement by changing drone trajectory to avoid the obstacle.

The processor may be configured to determine whether one or more slots on the moving base are occupied. The processor may be configured to provide information for controlling an adjustable landing pad on the moving base.

A method performed by a drone is also described. The method includes determining a distance between the drone and a moving base. The method also includes controlling a computer vision tracking algorithm based on the distance. The method further includes controlling drone movement based on the computer vision tracking algorithm.

A vehicle is also described. The vehicle includes a depth sensor configured to provide information for determining a distance between a drone and the vehicle. The vehicle also includes a processor configured to control a computer vision tracking algorithm based on the distance, and to send information for controlling drone movement based on the computer vision tracking algorithm. The information may include drone position information and drone movement information determined by the vehicle based on the computer vision tracking algorithm.

The processor may be configured to control the computer vision tracking algorithm by increasing tracking when the distance is within a distance threshold. The processor may be configured to control jitter of the computer vision tracking algorithm. The processor may be configured to control the jitter by converting an increased number of red-green-blue (RGB) frames to hue-saturation-value (HSV) frames.

The processor may be configured to control the jitter by computing a saliency score based on a model and at least a portion of a frame. The processor may also be configured to the control the jitter by determining whether the frame is a valid frame for tracking based on the saliency score. The processor may additionally be configured to control the jitter by providing the frame to the computer vision tracking algorithm in a case that the frame is a valid frame.

The processor may be configured to control drone movement by controlling drone acceleration based on the computer vision tracking algorithm. The processor may be configured to perform obstacle detection. The processor may be configured to control drone movement by changing drone trajectory to avoid the obstacle.

The processor may be configured to determine whether one or more slots on the vehicle are occupied. The processor may be configured to control an adjustable landing pad on the vehicle based on the computer vision tracking algorithm.

A method performed by a vehicle is also described. The method includes determining a distance between a drone and the vehicle. The method also includes controlling a computer vision tracking algorithm based on the distance. The method further includes sending information for controlling drone movement based on the computer vision tracking algorithm.

DETAILED DESCRIPTION

Figure 1:
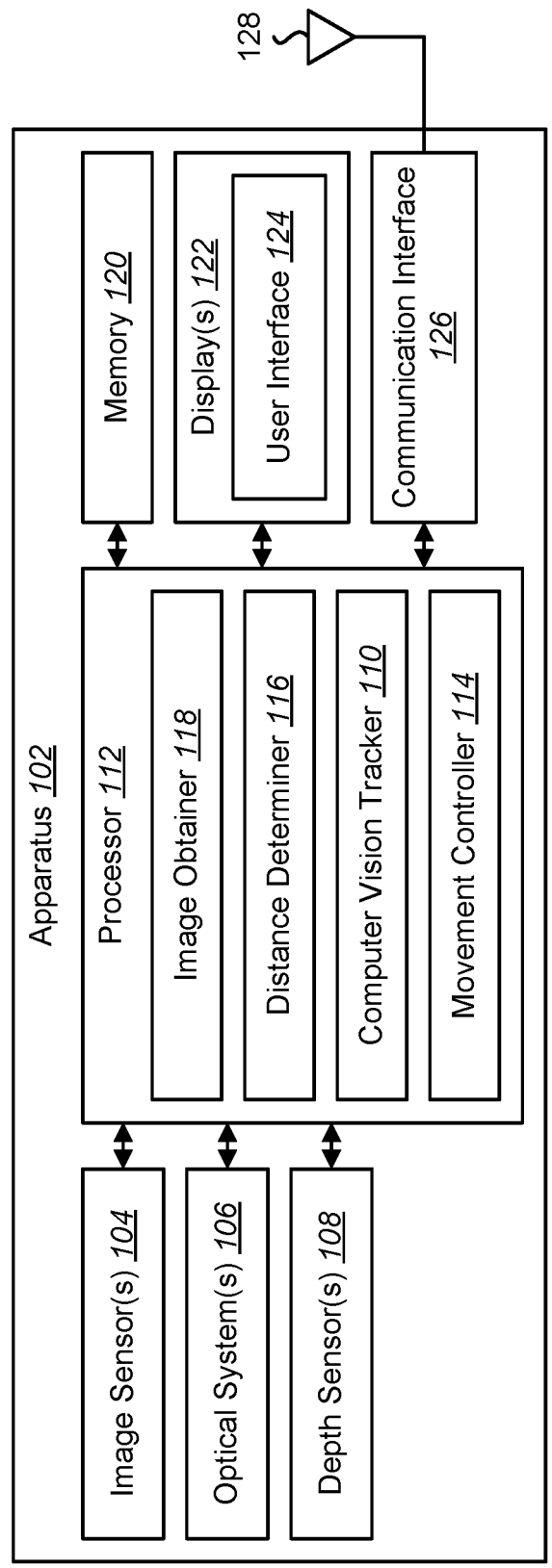
FIG. 1 is a block diagram illustrating one example of an apparatus in which systems and methods for landing a drone on a moving base may be implemented.

The systems and methods disclosed herein may relate to systems and methods for landing a drone on a moving base. For example, some configurations of the systems and methods disclosed herein may relate to computer vision usage for smoothly landing a drone on a car drone docking station.

In particular, several challenges exist in controlling drones. For example, safely and precisely landing drones over car drone docking stations amidst busy traffic is a challenge. In some cases, drones need to travel long distances. Mobile docking stations may help with this issue. However, the capability to land drones safely on car docking stations is difficult to implement. For example, performing an in-air smooth landing on moving vehicles (in between traffic, for example) securely and efficiently is a challenge. Accordingly, achieving long (e.g., indefinite, infinite, etc.) flight times by drones is impacted. This may limit large scale drone usage and commercialization with short flight times.

Some configurations of the systems and methods disclosed herein may enable medium and/or long distance (e.g., medium and/or long duration) travel by short distance capable drones. Accordingly, the range of the drones may be extended. For example, drones may be enabled to travel for long (e.g., indefinite, infinite, etc.) flight times using car drone charging and/or docking stations. For instance, a drone that is capable of flying for 20 minutes may extend its range by using mobile charging stations and/or relaying with other drones. In one example, 3 drones capable of flying 20 minutes each may match the range of a person walking for an hour. Accordingly, a drone may begin at a drone source location and may use a computer vision algorithm to land on one or more car docking stations. Once the drone is charged, it may continue to a destination location. It should be noted that the systems and methods disclosed herein may be implemented in a wide variety of contexts (e.g., in a chipset used in drones, a chipset used in a vehicle, in a server that controls one or more drones, etc.). For example, some configurations of the systems and methods disclosed herein may be implemented as part of a computer vision module, implemented in robotics, and/or implemented in a navigation system, etc.

Some configurations of the systems and methods disclosed herein may use one or more computer vision algorithms for tracking and/or recognition of docking stations and/or one or more drones. Depth sensors (e.g., camera depth sensors, stereoscopic cameras, lidar, radar, time-of-flight (TOF) cameras, infrared ranging, ultrasound ranging, etc.) may be utilized to perform distance estimation and/or to control (e.g., accelerate and/or decelerate) drones based on their distance from the docking station. In some configurations, tracking may be increased when the drone nears the docking station to increase the accuracy of tracking the docking station entrance.

The systems and methods disclosed herein may enable one or more drone capabilities in a mobile context. For example, drones may deliver items (e.g., packages, mail, food, etc.) to moving vehicles and/or may receive items (e.g., packages, mail, garbage, etc.) from moving vehicles. Drones may provide a video feed for safety (e.g., traffic) purposes and/or recreational (e.g., sightseeing) purposes. For example, a drone may be deployed from a vehicle to scout traffic conditions, road conditions, and/or accidents by capturing video footage and relaying the video footage back to a vehicle. Additionally or alternatively, a drone may be deployed from a vehicle to relay video of a point of interest along a road. In another example, drones may be deployed from a vehicle for on-site package delivery. For example, a delivery vehicle may carry one or more drones, which may be deployed to deliver a package to a residence or business. This approach may enable drone delivery to locations that are too distant from a distribution center to be delivered by a short-range drone alone. Additionally or alternatively, a drone may be utilized in one or more agricultural operations. For example, the drone may be deployed from a tractor to scout for areas for agricultural work. Additionally or alternatively, the drone may be deployed to perform agricultural work (e.g., spread fertilizer, seed the ground, spread pesticide, etc.).

Some configurations of the systems and methods disclosed herein may provide a benefit of better and efficient landing of drones in flight on a moving base (e.g., vehicle, car, landing pad, docking station, landing pad mounted at some location on the moving base, etc.). For example, a drone may be landed successfully when the drone and the landing site (e.g., moving base) are both in motion.

Some configurations of the systems and methods disclosed herein may utilize one or more computer vision algorithms for tracking and/or recognition of the docking stations to assist in the smooth landing of drones in busy traffic, for example. The ability to gauge the relative distance changes between the drone and moving base may assist in landing. For example, drones may accelerate or decelerate based on their distance from the moving base (e.g., car docking station). The distance may be gauged with a depth sensor. This may assist in providing an efficient and smooth landing solution for an aerial drone.

Some configurations of the systems and methods disclosed herein may provide accuracy improvements. For example, once the drone is within a distance (e.g., a distance threshold) and is decelerating with respect to a car, tracking may be performed faster to ensure that the drone does not miss the docking station. Faster tracking may increase efficiency of docking station detection and landing.

Some configurations of the systems and methods disclosed herein may provide speed improvements. For example, the distance estimation and movement control (e.g., accelerating, decelerating, etc.) of drones based on their distance from the car drone docking stations may enable a faster landing speed (e.g., shorter landing time).

In some approaches, a global positioning system (GPS) may be used for tracking. However, GPS alone may be limited inside tunnels, buildings, etc. Some configurations of computer vision systems may not have the constraints of GPS signal presence, etc.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an apparatus 102 in which systems and methods for landing a drone on a moving base may be implemented. Examples of the apparatus 102 include electronic devices, integrated circuits, cameras, video camcorders, digital cameras, cellular phones, smart phones, computers (e.g., desktop computers, laptop computers, etc.), tablet devices, media players, televisions, vehicles, automobiles, an Advanced Driver Assistance System (ADAS) in a vehicle, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, security devices, etc. The apparatus 102 may include one or more components or elements. One or more of the components or elements may be implemented in hardware (e.g., circuitry) or a combination of hardware and software (e.g., a processor with instructions).

In some configurations, the apparatus 102 may be a drone, may be included in a drone, and/or may be coupled to a drone. In other configurations, the apparatus 102 may be an electronic device that is remote from the drone. For example, the apparatus 102 may be an electronic device (e.g., computer, integrated circuit, etc.) in communication with the drone. In some examples, the apparatus 102 may be implemented in a moving base (e.g., a vehicle, car, truck, train, aircraft, another drone, etc.). For instance, a drone may supply image information, depth information, motion sensor information, and/or movement control information to a remote electronic device. The remote electronic device may utilize one or more of the information to perform one or more operations. For example, a remote electronic device may determine a distance between a drone and a moving base based on depth information and/or image information. The remote electronic device may perform computer vision detection and/or tracking based on the image information. The remote electronic device may determine movement information and/or may control the movement of a drone remotely based on the image information and/or depth information. For example, the remote electronic device may perform one or more operations and may send corresponding information (e.g., operation outputs, control information, etc.) to the drone. Accordingly, one or more of the functions, procedures, methods, structures, etc., described in connection with the apparatus 102 may be implemented in a drone itself and/or in a remote electronic device (e.g., moving base, vehicle, remote server, etc.) in communication with a drone. It should also be noted that functionality may be divided between a drone and a remote electronic device. For example, a remote electronic device may determine a distance and/or perform computer vision tracking, while the drone itself may control movement based on information provided by the remote electronic device.

In some configurations, the apparatus 102 may include a processor 112, a memory 120, one or more displays 122, one or more image sensors 104, one or more optical systems 106, one or more depth sensors 108, and/or a communication interface 126. The processor 112 may be coupled to (e.g., in electronic communication with) the memory 120, display(s) 122, image sensor(s) 104, optical system(s) 106, depth sensor(s) 108, and/or communication interface 126. It should be noted that one or more of the components and/or elements illustrated in FIG. 1 may be optional in some configurations. For example, the apparatus 102 may not include image sensor(s) 104, optical system(s) 106, depth sensor(s) 108, a display 122, and/or a communication interface 126 in some configurations. In some implementations, the apparatus 102 may include one or more motion sensors (e.g., accelerometers).

In some configurations, the apparatus 102 may perform one or more of the functions, procedures, methods, steps, etc., described in connection with one or more of FIGS. 2-10. Additionally or alternatively, the apparatus 102 may include one or more of the structures described in connection with one or more of FIGS. 2-10.

The communication interface 126 may enable the apparatus 102 to communicate with one or more other electronic devices. For example, the communication interface 126 may provide an interface for wired and/or wireless communications. In some configurations, the communication interface 126 may be coupled to one or more antennas 128 for transmitting and/or receiving radio frequency (RF) signals. Additionally or alternatively, the communication interface 126 may enable one or more kinds of wireline (e.g., Universal Serial Bus (USB), Ethernet, etc.) communication.

In some configurations, multiple communication interfaces 126 may be implemented and/or utilized. For example, one communication interface 126 may be a cellular (e.g., 3G, Long Term Evolution (LTE), CDMA, etc.) communication interface 126, another communication interface 126 may be an Ethernet interface, another communication interface 126 may be a universal serial bus (USB) interface, and yet another communication interface 126 may be a wireless local area network (WLAN) interface (e.g., Institute of Electrical and Electronics Engineers (IEEE) 802.11 interface). In some configurations, the communication interface 126 may send information (e.g., image information, navigation information, control information (e.g., movement control information, control signal, etc.), position information (e.g., roll, pitch, yaw, distances, heading, etc.), movement information (e.g., velocity, acceleration, planned path, etc.)) to and/or receive information (e.g., image information, navigation information, control information (e.g., movement control information, control signal, etc.), position information (e.g., roll, pitch, yaw, distances, heading, etc.), movement information (e.g., velocity, acceleration, planned path, etc.)) from another device (e.g., a vehicle, a computer, a drone, a smart phone, a camera, a display, a remote server, etc.). For example, a drone and a moving base (e.g., vehicle, car, truck, landing pad, etc.) and/or a remote electronic device may communicate using one or more communication interfaces.

In some configurations, the apparatus 102 may obtain one or more images (e.g., digital images, image frames, video, etc.). For example, the apparatus 102 may include the image sensor(s) 104 and the optical system(s) 106 (e.g., lenses) that focus images of scene(s) and/or object(s) that are located within the field of view of the optical system 106 onto the image sensor 104. A camera (e.g., a visual spectrum camera) may include at least one image sensor and at least one optical system. In some configurations, the image sensor(s) 104 may capture the one or more images. The optical system(s) 106 may be coupled to and/or controlled by the processor 112. Additionally or alternatively, the apparatus 102 may request and/or receive the one or more images from another device (e.g., one or more external image sensor(s) coupled to the apparatus 102, a drone, a vehicle, network server, automobile camera(s), etc.). In some configurations, the apparatus 102 may request and/or receive the one or more images via the communication interface 126. For example, the apparatus 102 may or may not include camera(s) (e.g., image sensor(s) 104 and/or optical system(s) 106) and may receive images from one or more remote device(s). One or more of the images (e.g., image frames) may include one or more scene(s) and/or one or more object(s). The image(s) may be in the visible domain. For example, the image(s) may include data that represents one or more aspects of visible light (e.g., color space, color model, color, brightness, luminance, etc.). In some implementations, the image(s) may be expressed in a particular color space (e.g., red-green-blue (RGB)).

In some configurations, the apparatus 102 may include an image data buffer (not shown). The image data buffer may buffer (e.g., store) image data from the image sensor 104. The buffered image data may be provided to the processor 112.

In some configurations, the apparatus 102 may include a camera software application and/or a display 122. When the camera application is running, images of objects that are located within the field of view of the optical system(s) 106 may be captured by the image sensor(s) 104. The images that are being captured by the image sensor(s) 104 may be presented on the display 122. In some configurations, these images may be displayed in rapid succession at a relatively high frame rate so that, at any given moment in time, the scene(s) and/or object(s) that are located within the field of view of the optical system 106 are presented on the display 122. The one or more images obtained by the apparatus 102 may be one or more video frames and/or one or more still images. In some configurations, the display 122 may present additional or alternative information. For example, the display 122 may present depth information (e.g., numbers representing one or more estimated distances to one or more objects (e.g., a moving base, a landing pad, a slot of a landing pad, etc.)).

In some configurations, the apparatus 102 may present a user interface 124 on the display 122. For example, the user interface 124 may enable a user to interact with the apparatus 102. In some configurations, the user interface 124 may enable a user to indicate preferences and/or to interact with the apparatus 102.

In some configurations, the display 122 may be a touchscreen that receives input from physical touch (by a finger, stylus, or other tool, for example). For instance, the touchscreen may be an input interface that receives a touch input indicating user preference(s) and/or one or more modifications of apparatus 102 behavior. Additionally or alternatively, the apparatus 102 may include or be coupled to another input interface. For example, the apparatus 102 may include a camera facing a user and may detect user gestures (e.g., hand gestures, arm gestures, eye tracking, eyelid blink, etc.). In another example, the apparatus 102 may be coupled to a mouse and may detect a mouse click indicating an input. It should be noted that no user-initiated input may be utilized in some configurations. For example, the apparatus 102 may perform drone landing automatically in some configurations.

The memory 120 may store instructions and/or data. The processor 112 may access (e.g., read from and/or write to) the memory 120. Examples of instructions and/or data that may be stored by the memory 120 may include measured information, depth information, depth maps, distance data, image data, object data (e.g., location, size, shape, etc.), movement data, movement instructions, tracking data, image obtainer 118 instructions, distance determiner 116 instructions, computer vision tracker 110 instructions, movement controller 114 instructions, etc.

The processor 112 may include and/or implement an image obtainer 118. One or more of the image frames may be provided to the image obtainer 118. In some configurations, the image obtainer 118 may operate in accordance with one or more of the approaches, functions, procedures, steps and/or structures described in connection with one or more of FIGS. 1-10. The image obtainer 118 may obtain images (e.g., image frames, pixel data, etc.) from one or more cameras (e.g., normal cameras, wide-angle cameras, fisheye cameras, etc.). For example, the image obtainer 118 may receive image data from one or more image sensors 104 and/or from one or more external cameras. The images may be captured from multiple cameras (at different locations, for example).

In some configurations, the image obtainer 118 may request and/or receive one or more images (e.g., image frames, pixel data, etc.). For example, the image obtainer 118 may request and/or receive one or more images from a remote device (e.g., external camera(s), remote server, remote electronic device, drone, etc.) via the communication interface 126.

In some configurations, the image obtainer 118 may convert color spaces of one or more images. For example, the one or more images (e.g., image frames) provided to the image obtainer 118 may be in an RGB color space. In some configurations, the image obtainer 118 may convert one or more of the images from the RGB color space to another color space. For example, the image obtainer 118 may convert one or more images from the RGB color space to the hue-saturation-value (HSV) color space.

In some configurations, the image obtainer 118 may convert the color space of a subset of the images (e.g., image frames) or of a number of images at a frame rate (e.g., an adjustable frame rate). The images with a converted color space may be provided to a computer vision tracking algorithm. In some configurations, the image obtainer 118 may change a number of images (e.g., image frames) that are converted in color space. For example, the image obtainer 118 may convert an increased number (e.g., more frames due to an increased frame rate and/or a larger proportion of frames) of RGB frames to HSV frames in order to control (e.g., reduce) jitter of the computer vision tracking algorithm. In some configurations, the processor 112 (e.g., the image obtainer 118) may increase a number of converted frames when the drone is within a threshold (e.g., the distance threshold or another threshold) from the moving base. For instance, once the drone is within the distance and is accelerating or decelerating with respect to the moving base (e.g., car), tracking may be performed faster in order to ensure that the drone does not miss the moving base (e.g., landing pad, car docking station, etc.). In some approaches, the image obtainer 118 may convert frames at a first conversion rate (e.g., based on a set of image frames with a particular frequency and/or period). When the drone is within a threshold (e.g., the distance threshold or another threshold), the processor 112 (e.g., image obtainer 118) may increase the conversion rate (e.g., the number and/or frequency of converted frames) to a second conversion rate. The second conversion rate may be higher than the first conversion rate.

While a drone travels (in traffic, for example) the input image frames may have noise. For instance, noise in the input camera frames may happen in busy traffic due to light reflections and/or traffic congestion. This may cause difficulty in locating the moving base, the landing pad, etc. Using computer vision algorithms for tracking and/or recognition of the moving base (e.g., landing pad, docking station, etc.) may help in the smooth landing of drones in busy traffic or other noisy circumstances. For example, one or more incoming RGB frames may be converted into HSV. A smoothing algorithm may be applied to the frames. Then, the moving base (e.g., the landing pad, car docking station, etc.) may be tracked. The input frame rate (e.g., number of frames per second) of the drone camera may be increased (e.g., bumped up) when the drone is at a certain distance to the moving base (e.g., landing pad). The increase in the frame rate (e.g., frames per second) may ensure more accurate tracking of the moving base (e.g., landing pad) over a higher number of frames per second.

In some configurations, the image obtainer 118 may filter colors outside of a range. For example, colors that are outside of a range may be removed or suppressed. In some approaches, computer vision algorithms used on color images may be extensions to algorithms designed for grayscale images (e.g., k-means or fuzzy clustering of pixel colors, or canny edge detection). Some simple approaches may separately pass each color component through the same algorithm. Accordingly, it may be beneficial when the features of interest can be distinguished in the color dimensions used. Because the R, G, and B components of an object's color in a digital image may correlate with the amount of light hitting the object (and with each other, for instance), image descriptions in terms of those components may make object discrimination difficult. Descriptions in terms of hue/lightness/chroma and/or hue/lightness/saturation may be more relevant in some approaches. This may be one motivation for converting RGB values into HSV frames.

The one or more depth sensors 108 may sense (e.g., detect) the depth of a scene and/or of one or more objects. For example, the depth sensor(s) 108 may sample a distance between the depth sensor(s) 108 and one or more objects (e.g., a moving base, a landing pad, a slot of a landing pad, a drone, etc.). Examples of depth sensors 108 include infrared time-of-flight (ToF) camera(s), stereoscopic cameras (e.g., image sensor(s) 104 and/or optical system(s) 106), radar, lidar, interferometer, etc. The depth sensor(s) 108 may provide depth information (and/or other information from which depth information may be obtained) to the processor 112. The depth information and/or other information may indicate distance(s) between the depth sensor(s) 108 and the scene and/or object(s).

In some configurations, the depth sensor(s) 108 may be included in the apparatus 102. In other configurations, the depth sensor(s) 108 may be separate from and coupled to or linked to the apparatus 102. For example, the depth sensor(s) 108 may communicate with the apparatus 102 (via the communication interface 126, for example) to provide depth information (and/or information from which depth information may be obtained) to the processor 112. It should be noted that the image sensor(s) 104 and/or optical system(s) 106 (e.g., cameras) may be the depth sensor(s) 108 in some configurations.

The depth sensor(s) 108 may sense depth at one or more samplings. A sampling may be a time at which depth is sensed. For example, the depth sensor(s) 108 may sample depth information (and/or information from which depth information may be obtained) at a first sampling and at a second sampling. It should be noted that as used herein, ordinal terms such as "first," "second," "third," etc., may or may not imply an order. For example, a "first sampling" may occur before, after, concurrently with (e.g., in overlapping time frames) or at the same time as a "second sampling."

The depth sensor(s) 108 may capture depth information (and/or information for determining depth information). In some configurations, the depth information may include a set of depth measurements (e.g., distances, depths, depth values, etc.). For example, a depth sensor 108 may sample a scene within a field of view (e.g., detection field) to produce the set of depth measurements. The set of depth measurements may be or may not be included in a depth map in some configurations.

The depth sensor(s) 108 may sense (e.g., detect, capture, etc.) information for determining a distance between the apparatus 102 (e.g., a drone) and a moving base (e.g., vehicle, automobile, car, truck, aircraft, landing pad, slot of a landing pad, docking station, etc.). For example, the depth sensor(s) 108 may provide a distance measurement indicating the distance to the moving base from the depth sensor(s) 108 (or the distance to the drone from depth sensor(s) 108 on the moving base, for instance). In other examples, the depth sensor(s) 108 may provide other information for determining the distance. For instance, the depth sensor(s) 108 may sense a time-of-flight (e.g., an amount of time between sending a signal and receiving a reflection of the signal), a disparity between stereoscopic cameras, etc. This information may be utilized to calculate the distance between the depth sensor(s) 108 and the moving base.

The processor 112 may include and/or implement a distance determiner 116. The distance determiner 116 may obtain information for determining a distance (e.g., depth information). Depth information may indicate one or more distances to (e.g., depth measurements of, depths of, depth values of, etc.) one or more physical bodies (e.g., objects, faces, terrain, structures, drones, etc.) from the depth sensor(s) 108. For example, depth information may be one or more numerical indications of distance, in units of distance (e.g., feet, inches, yards, miles, meters, centimeters, kilometers, etc.). In some configurations, the distance determiner 116 may obtain depth information (and/or other information from which depth information may be determined) from the depth sensor(s) 108 (and/or image sensor(s) 104). The depth information may be obtained at one or multiple samplings over time (e.g., a first sampling, a second sampling, etc.).

In some configurations, the depth information may be obtained (e.g., determined) based on multiple images (e.g., stereoscopic depth determination), motion information, and/or other depth sensing. In some approaches, one or more cameras (e.g., image sensor(s) 104 and/or optical system(s) 106) may be depth sensors 108 and/or may be utilized as depth sensors 108. In some configurations, for example, the distance determiner 116 may receive multiple images (from the image sensor(s) 104 and/or from remote image sensor(s)). The distance determiner 116 may triangulate one or more objects in the images (in overlapping areas of the images, for instance) to determine the depth information (e.g., distances, depths, depth values, depth measurements, etc.) between an image sensor and the one or more objects. For example, the three-dimensional (3D) position of feature points (referenced in a first camera coordinate system) may be calculated from two (or more) calibrated cameras. Then, the depth information may be estimated through triangulation.

In some configurations, the distance determiner 116 may determine the depth information based on moving cameras (e.g., an approach referred to as structure from motion (SfM)). For example, depth may be estimated based on two or more image frames due to camera motion (e.g., the motion of the camera(s) relative to one or more objects in a scene). For instance, by observing the motion of an object over time (in images over time or frames, for instance), the distance determiner 116 may determine a distance between the image sensor (e.g., image sensor(s) 104 and/or remote image sensor(s)) and the object. The object points from two views may be aligned and/or matched and the relative camera motion may be estimated. Then, the depth information (e.g., distances) of the object may be estimated (e.g., generated) by triangulation.

In some configurations, the distance determiner 116 may obtain depth information by utilizing one or more additional or alternative depth sensing approaches. For example, the distance determiner 116 may receive information (e.g., measured information) from the depth sensor(s) 108 (and/or image sensor(s) 104) that may be utilized to determine one or more distances of a scene. Examples of other depth sensors include time-of-flight cameras (e.g., infrared time-of-flight cameras), interferometers, radar, lidar, sonic depth sensors, ultrasonic depth sensors, etc. One or more depth sensors 108 may be included within, may be coupled to, and/or may be in communication with the apparatus 102 in some configurations. The distance determiner 116 may estimate (e.g., compute) depth information based on the measured information from one or more depth sensors and/or may receive depth information from the one or more depth sensors. For example, the distance determiner 116 may receive time-of-flight information from a time-of-flight camera and may compute depth information based on the time-of-flight information.

Additionally or alternatively, the distance determiner 116 may request and/or receive depth information directly from the one or more depth sensors 108 (in configurations where the depth sensor(s) 108 directly provides depth information, for example). For instance, stereoscopic visual spectrum cameras (e.g., image sensors 104 and/or optical systems 106) and/or one or more depth sensors 108 may compute depth information (e.g., distances) based on measured information (e.g., images, time, time-of-flight, phase shift, Doppler shift, etc.). Accordingly, the distance determiner 116 may receive depth information directly from one or more visual spectrum cameras, one or more infrared time-of-flight cameras, interferometers, lidar, radar, sonic/ultrasonic depth sensors, etc.

In some configurations, a combination of approaches for obtaining depth information (e.g., multi-modal depth) may be implemented. For example, a combination of SfM, stereoscopic triangulation, and lidar may be implemented. Other combinations may be implemented. Utilizing multi-modal depth estimation may improve the quality of the depth information.

In some configurations, the distance determiner 116 may obtain (e.g., determine) one or more depth maps. Depth maps may include depth information and/or may be determined based on the depth information. For example, a depth map may be a set of depth information (e.g., depth measurements, distances, etc.) over a range (e.g., horizontal range, vertical range and/or angular range relative to the depth sensor(s) 108) of a scene. In some configurations, the distance determiner 116 may receive depth maps from the depth sensor(s) 108. For example, the depth sensor(s) 108 may directly provide depth information (e.g., distances) over the range of the scene.

Additionally or alternatively, the distance determiner 116 may obtain (e.g., determine) depth maps based on the depth information. For example, the depth sensor(s) 108 may provide measured information that may be used to determine depth information and/or depth maps. For instance, the measured information may include time-of-flight time measurements, image data, disparity information between images, received (e.g., reflected) signal power, received (e.g., reflected) signal amplitude, Doppler shift, signal phase shift, etc. The distance determiner 116 may determine depth maps based on the measured information. For example, the distance determiner 116 may calculate a set of depth information (e.g., distances, depths, depth values, etc.) based on received (e.g., reflected) signal power, received (e.g., reflected) signal amplitude, Doppler shift, signal phase shift, image data (e.g., one or more images), stereoscopic image measurements (e.g., disparity between the same point in image data captured by two or more cameras), structure from motion (SfM), etc. In some configurations, a depth map may include a set of depth information (e.g., numerical distances, depths, etc.) and may not include other kinds of data (e.g., visual domain data, time domain data, frequency domain data, etc.). It should be noted that while depth information and/or a depth map may be determined based on visual domain data in some configurations, the depth information and/or depth map itself may or may not include visual domain data (e.g., image data).

In some configurations, the distance determiner 116 may determine the distance to the moving base (and/or to the landing pad, landing pad slot, docking station, etc.) based on object detection (e.g., computer vision detection). For example, the distance determiner 116 (or the computer vision tracker 110) may detect the location of the moving base (and/or landing pad, landing pad slot, docking station, etc.) based on one or more images (from the image sensor(s) 104, for example). The distance determiner 116 may use the location of the moving base (and/or the landing pad, landing pad slot, docking station, etc.) in the image to determine the distance. For example, the distance determiner 116 may determine a disparity between images from stereoscopic cameras at the location of the moving base (and/or the landing pad, landing pad slot, docking station, etc.) to triangulate the distance to the moving base (and/or to the landing pad, landing pad slot, docking station, etc.). In another example, the distance determiner 116 may utilize one or more values from the depth sensor(s) (e.g., depth map) corresponding to the detected location, in the image(s), of the moving base (and/or of the landing pad, landing pad slot, docking station, etc.).

In some configurations, the distance determiner 116 may determine the distance to the drone based on object detection (e.g., computer vision detection). For example, the distance determiner 116 (or the computer vision tracker 110) may detect the location of the drone based on one or more images (from the image sensor(s) 104, for example). The distance determiner 116 may use the location of the drone in the image to determine the distance. For example, the distance determiner 116 may determine a disparity between images from stereoscopic cameras at the location of the drone to triangulate the distance to the drone from the moving base (e.g., landing pad, landing pad slot, docking station, etc.). In another example, the distance determiner 116 may utilize one or more values from the depth sensor(s) (e.g., depth map) corresponding to the detected location, in the image(s), of the drone.

It should be noted that while depth information may be relative to the location of the depth sensor(s) in some configurations, the depth information may or may not be mapped (e.g., transformed) relative to another point in some configurations. For example, the apparatus 102 may map the depth information to be relative to an arbitrary point (e.g., the center of a drone, the landing gear of a drone, the center of a vehicle, the center of a device, etc.).

The processor 112 may include and/or implement a computer vision tracker 110. The distance determiner 116 may provide the distance to the computer vision tracker 110 in some configurations. The computer vision tracker 110 may perform computer vision detection and/or tracking of the moving base (and/or of the landing pad, landing pad slot, docking station, etc.) and/or of the drone. The computer vision tracking may be performed with a computer vision tracking algorithm. The computer vision tracking algorithm may perform one or more techniques to detect and/or track the location of an object (e.g., the moving base, landing pad, landing pad slot, docking station, drone, etc.). For example, the computer vision tracking algorithm may perform keypoint detection, edge detection, corner detection, Hough transform, scale invariant feature transform (SIFT), point cloud matching, optical flow, etc., to detect and/or track an object (e.g., the moving base, landing pad, landing pad slot, docking station, drone, etc.). In some configurations, the computer vision tracking algorithm may search an image or a subset of an image (e.g., a region of interest) in order to match a model (e.g., model image, feature vectors, keypoints, etc.) to an object (e.g., moving base, landing pad, drone, etc.). The location of the image where the model best matches may be the tracked (e.g., estimated) location of the object in the image. In some approaches, the image location (e.g., the location in a two-dimensional image) may be transformed to 3D coordinates.

In some configurations, the moving base (e.g., landing pad, car docking station, etc.) and/or drone may be tracked using computer vision algorithms like object detection, text recognition, machine learning, etc. In some approaches, object detection may use neural networks that are trained to perform object detection based on specific classifiers. These classifiers may indicate the moving base, landing pad, drone, etc.

Once the moving base (e.g., landing pad) and/or drone is detected, the processor 112 (e.g., a control system) may be used to detect the distance of the drone and the moving base (e.g., landing pad, landing station, docking station, etc.). The distance may be detected using depth sensors 108. The drone may then accelerate or decelerate depending upon the relative position of the drone and the landing station. For example, the drone may accelerate speed if it is behind and may decelerate if it is ahead of the moving base (e.g., landing pad, landing station, etc.).

In some configurations, the moving base (e.g., landing pad, landing pad slot, docking station, etc.) and/or drone may be marked with one or more symbols (e.g., shapes, targets, one or more letters, one or more words, license plate number, etc.) and/or one or more colors. The computer vision tracker 110 may detect and/or track the moving base (e.g., landing pad, landing pad slot, docking station, etc.) and/or drone based on the one or more symbols and/or one or more colors. For example, the computer vision tracker 110 may recognize a particular symbol and/or color in order to detect and/or track the moving base (e.g., landing pad, landing pad slot, docking station, etc.) and/or drone.

The computer vision tracker 110 may additionally or alternatively detect and/or track the moving base (e.g., landing pad, landing pad slot, docking station, etc.) and/or drone based on one or more other attributes. For example, the computer vision tracker 110 may detect and/or track the physical shape of one or more objects (e.g., moving base, landing pad, landing pad slot, docking station, vehicle shape, drone, etc.). In some configurations, the moving base (e.g., landing pad, landing pad slot, docking station, etc.) and/or drone may not be marked with a specific symbol and/or color.

In some configurations, one or more landing pads may be mounted and/or implemented in various configurations and/or arrangements on a moving base (e.g., vehicle, car, truck, agricultural vehicle, drone, aircraft, train, drone, boat, bicycle, etc.). For example, a landing pad may be mounted in the top of the moving base, on the roof of the moving base, the back of the moving base, on the side of the moving base (e.g., on a door), on the front (e.g., hood) of the moving base, underneath the moving base, etc.

The processor 112 (e.g., the computer vision tracker 110) may control the computer vision tracking algorithm. For example, the computer vision tracker 110 may control the computer vision tracking algorithm based on the distance. In some configurations, the processor 112 (e.g., the computer vision tracker 110) may increase tracking when the distance is within a distance threshold. For example, the computer vision tracker 110 may execute the computer vision tracking algorithm at a first rate (initially, for example). Executing the computer vision tracking algorithm at the first rate may be at a first frame rate (e.g., based on a set of image frames with a particular frequency and/or period). When the distance is less than a distance threshold (e.g., when the drone is within a particular distance from the moving base (e.g., landing pad, landing pad slot, and/or docking station, etc.)), the processor 112 (e.g., computer vision tracker 110) may increase tracking by switching the computer vision tracking algorithm to execute at a second rate. The second rate may be higher than the first rate. For example, the second rate may be at a second frame rate that is higher than the first frame rate. Accordingly, the computer vision tracking algorithm may perform tracking at an increased frequency. It should be noted that multiple thresholds (e.g., one or more distance thresholds and/or one or more other thresholds) may be utilized in some configurations, where different thresholds may trigger different actions and/or degrees of action. For example, when a drone is within a first distance threshold, tracking may be increased by a first amount, and when a drone is within a second distance threshold, tracking may be increased by a second amount.

Increasing the tracking based on distance may provide one or more benefits. For example, performing tracking at a lower rate while the drone is further away may provide greater efficiency (e.g., better battery life) while assisting drone movement. Performing tracking at a higher rate when the drone is within the distance threshold may provide increased accuracy, when increased accuracy may be beneficial to assist with the final approach and/or landing.

In some configurations, the computer vision tracker 110 may additionally or alternatively determine distance and/or position. For example, the computer vision tracker 110 may determine three-dimensional (e.g., x, y, and z) coordinates of the moving base (e.g., landing pad, landing pad slot, docking station, etc.) and/or drone based on the tracking. For instance, the size and/or position of the moving base (e.g., landing pad, landing pad slot, docking station, marking on the landing pad, marking on the moving base, etc.) and/or drone in one or more images may be utilized to infer (e.g., calculate, compute) the distance and/or position of the drone relative to the moving base (e.g., landing pad, landing pad slot, docking station, etc.). In some configurations, the distance determined based on the computer vision may be utilized in addition to or alternatively from the distance determined based on depth sensing.

In some approaches, the computer vision tracker 110 may determine flight navigation for the drone if the tracker loses the object (e.g., moving base, landing pad, landing pad slot, docking station, etc.). For example, the distance determiner 116 may check the distance using the depth sensor(s) 108. One or more sensors (e.g., accelerometers, tilt sensors, gyroscopes, etc.) may be utilized to determine (e.g., validate) the orientation of the drone (e.g., aerial drone). In some cases, the drone may go out of range and may need to accelerate more to track the moving base (e.g., landing pad, landing pad slot, docking station, etc.). In some configurations, the computer vision tracker 110 may track the moving base (e.g., landing pad, landing pad slot, docking station, etc.) with an associated tracking identification. If the tracking identification is lost, the computer vision tracker 110 may indicate that the drone does not have the moving base (e.g., landing pad, landing pad slot, docking station, etc.) in a field of view (and/or that the moving base does not have the drone is a field of view, for example). The movement controller 114 may accordingly cause the drone to re-orient and/or to accelerate to track the moving base (e.g., landing pad, landing pad slot, docking station, etc.) and/or drone in response to the lost tracking indication.

In some configurations, the apparatus 102 (e.g., processor 112, computer vision tracker 110, etc.) may control (e.g., reduce) jitter by screening one or more image frames. For example, the computer vision tracker 110 may control jitter by computing a saliency score based on a model and at least a portion of an image frame. The computer vision tracker 110 may determine whether the frame is a valid frame (e.g., whether the frame includes useful information, whether the moving base (e.g., landing pad, landing pad slot, docking station, etc.) and/or drone is included in the frame, etc.). In a case that the frame is a valid frame, the computer vision tracker 110 may provide the frame to the computer vision tracking algorithm. Otherwise, the frame may not be provided to the computer vision tracking algorithm. This may help to control (e.g., reduce) jitter.

In some configurations, the apparatus 102 (e.g., processor 112, computer vision tracker 110, etc.) may perform frame smoothing on one or more frames provided to the computer vision tracking algorithm. For example, the computer vision tracker 110 may determine a historical average of moving base (e.g., landing pad, landing pad slot, docking station, etc.) and/or drone locations over two or more frames. For instance, the computer vision tracker 110 may compute a weighted average of one or more previous locations and the current location to determine an average location. This may help the tracked average location to smoothly progress over time.

In some approaches, frame smoothing may be performed as follows. The apparatus 102 (e.g., processor 112, computer vision tracker 110, etc.) may calculate a history of the location of the moving base (e.g., landing pad, landing pad slot, docking station, etc.) and/or drone over a number of frames (e.g., three frames). The history may include the location of the drone, location of the moving base (e.g., landing pad, etc.) relative to the drone (using the depth sensor(s) 108, for example), sensor information of the drone (e.g., yaw, roll, and pitch for a gyroscope; x, y, and z coordinates for an accelerometer, etc.), and/or current velocity of the drone. In this way, the apparatus 102 (e.g., processor 112, computer vision tracker 110, etc.) may establish a relationship between the velocity of the drone and the location of the moving base (e.g., landing pad, etc.).

If the drone moves at a same speed relative to the moving base (e.g., landing pad, etc.), the relative distance of drone and moving base (e.g., landing pad, etc.) may not change. If the drone is accelerating or decelerating relative to the moving base (e.g., landing pad, etc.), the relative position of the landing pad may change. Based on the sensor information and the history, the apparatus 102 (e.g., the processor 112, computer vision tracker 110, etc.) may verify whether the moving base (e.g., landing pad, etc.) is at a distance (e.g., an expected distance, an estimated distance, and/or a predicted distance, etc.) relative to the drone. If the distance is off by a verification threshold, the smoothing algorithm may eliminate the frame from feeding the frame to the computer vision tracking algorithm.

In some configurations, the processor 112 (e.g., computer vision tracker 110) may create one or more three-dimensional (3D) models of the surrounding environment (e.g., street view, landscapes, etc.). This may involve 3D vector analysis techniques and algebraic computation to achieve location determination (e.g., fast location determination). The one or more 3D models may be compared with models of a graphic information system (GIS) and/or maps (from satellite data, for example) to determine (e.g., pinpoint) location. In this way, the apparatus 102 (e.g., processor 112, distance determiner 116, computer vision tracker 110, etc.) may estimate the difference in the actual location of the moving base (e.g., landing pad, etc.) and the location of the drone(s). Error analysis on the effects of sensor resolution in different distances and elevation angles may be included.

In some approaches, the apparatus 102 (e.g., processor 112, image obtainer 118, computer vision tracker 110, etc.) may detect image blurriness. Image blurriness may result from motion (e.g., fast motion). The apparatus 102 (e.g., processor 112, image obtainer 118, computer vision tracker 110, etc.) may apply smoothing filters to improve (e.g., reduce) image blurriness. If the blurriness still exists after the smoothing functions, then the apparatus 102 (e.g., processor 112, image obtainer 118, computer vision tracker 110, etc.) may eliminate the one or more blurry frames from the computer vision algorithm (e.g., engines) for tracking.

In some approaches, saliency scoring and/or frame smoothing may be performed as follows. Jitter and noise may be present (as the drone may be flying over busy traffic, for example). Saliency score detection may be used per frame, where some frames (e.g., frames with a high amount of noise) may be eliminated. Additionally or alternatively, smoothing filters may be applied to some frames (e.g., frames with a high amount of noise) to reduce the noise of the images. In some approaches, the saliency score may be calculated for a frame based on the features of the objects in the frame. The saliency score may include the features of the whether the moving base (e.g., landing pad, landing pad slot, docking station, etc.) is included in the frame. The saliency values of the objects may not match in frames that are noisy and have jitter. Smoothing filters may be applied to these noisy frames. If the noise level is still above a noise threshold (e.g., tolerance limit) then the frames may be discarded and not provided to the computer vision algorithms used for tracking.

In some configurations, the apparatus 102 (e.g., processor 112, computer vision tracker 110, etc.) may determine whether a moving base (e.g., one or more landing pads, one or more landing pad slots, one or more docking stations, etc.) is occupied. For example, the computer vision tracker 110 may perform object (e.g., drone) detection and/or recognition to determine whether the moving base (e.g., one or more landing pads, one or more landing pad slots, one or more docking stations, etc.) is occupied. For instance, if a landing pad slot is occupied, the computer vision tracker 110 may focus tracking on an unoccupied landing pad slot, if any. If all landing pad slots are occupied, the apparatus 102 (e.g., processor 112, computer vision tracker 110, movement controller 114, etc.) may abort landing and/or may notify another device (e.g., the moving base, another drone, etc.) that all landing pad slots are occupied. In some configurations, the apparatus 102 may command an occupying drone to launch in order to clear a landing pad slot to allow the landing drone to land. This may help in efficiently utilizing the landing pad capacity. Additionally or alternatively, the moving base may determine and/or provide information (e.g., latch engagement information, battery charge engagement information, docking information, etc.) to indicate (to a drone, for example) whether the moving base, landing pad, landing pad slot(s), and/or docking station(s) is or are occupied.

In some configurations, the apparatus 102 (e.g., processor 112, computer vision tracker 110, etc.) may provide information for controlling an adjustable landing pad on the moving base. For example, the apparatus 102 may send information to an adjustable mechanism of a landing pad in order to approximately match roll, pitch, and/or yaw of the landing drone.

The processor 112 may include and/or implement a movement controller 114. The movement controller 114 may control the movement (e.g., acceleration, deceleration, velocity, pitch, roll, yaw, etc.) of the apparatus 102 (e.g., a drone) or a remote device (e.g., a drone). For example, the movement controller 114 may control movement based on the computer vision tracking algorithm and/or the distance.

In some configurations, the movement (of the apparatus 102 and/or a remote device, for example) may be controlled in order to land the apparatus 102 or a remote device on a moving base. For example, if the computer vision algorithm indicates that the apparatus 102 or remote device is behind the moving base and/or landing pad (e.g., landing pad slot), the movement controller 114 may indicate acceleration for the movement. If the computer vision algorithm indicates that the apparatus 102 or remote device is ahead of the moving base and/or landing pad (e.g., landing pad slot), the movement controller 114 may indicate deceleration for the movement. If the computer vision algorithm indicates that the apparatus 102 or remote device is above the moving base and/or landing pad (e.g., landing pad slot), the movement controller 114 may indicate downward motion (e.g., lowering altitude for landing).

In some configurations, the movement controller 114 may optionally operate with other position information. For example, the movement controller 114 may operate in conjunction with global positioning system (GPS) or other navigation information (e.g., inertial navigation information based on motion sensors). For example, the apparatus 102 may determine other position information and/or may receive other position information. The other position information may indicate a position of the apparatus 102 and/or of a remote device. In one example, the apparatus 102 may be a drone that is attempting to land on a vehicle. The drone may receive GPS signals and determine a position of the drone. The drone may also receive position information from the vehicle. The drone (e.g., processor 112, movement controller 114, etc.) may compare the position of the drone with the position of the vehicle to determine the position of the drone relative to the position of the vehicle (e.g., position and/or distance).

The position information may be used in addition to or alternatively from the tracking information provided by the computer vision tracker 110 and/or the distance information provided by the distance determiner 116. For example, other position information (e.g., GPS information, inertial navigation information, etc.) may be utilized when the moving base and/or drone is too far away and/or is obstructed from the view of the image sensor(s) 104 and/or depth sensor(s) 108. Additionally or alternatively, the other position information may be utilized to reduce error occurring from noisy measurement of the image sensor(s) 104 and/or depth sensor(s) 108. In some cases, the other position information (e.g., GPS information) may not be highly accurate. For example, the other position information may be accurate to within a few meters (e.g., 4-8 meters). Accordingly, the other position information alone may not be accurate enough to accurately land a drone on a moving base in some cases.

In some configurations and/or cases, movement may occur in one or more stages. For example, a first stage may be referred to as an acquisition stage. In the acquisition stage, the drone and the moving base may be distant such that the moving base is not observable by the drone and/or such that the moving base (e.g., landing pad, landing pad slot, docking station, etc.) and/or drone may not be reliably detected and/or tracked with computer vision. During the first stage, the drone may fly towards the moving base using location information provided by the moving base (e.g., coordinate information, GPS information, route information, geographical information, etc.).

A second stage may be referred to as an approach stage. The approach stage may begin when the moving base and/or drone is or are detected and/or tracked with computer vision. The approach stage may utilize depth sensing and/or computer vision detection and/or tracking in order to control drone movement to fly above the moving base (e.g., landing pad, landing pad slot, docking station, etc.).

A third stage may be referred to as a landing stage. In the landing stage, the drone may be flying above (not behind or ahead of) the moving base (e.g., landing pad, landing pad slot, docking station, etc.). In the landing stage, the drone may lower altitude until landing is complete. It should be noted that the more general term "landing" and variations thereof may refer to one or more of the stages described.

In some configurations, the apparatus 102 (e.g., drone, a remote device, the moving base, etc.) may perform and/or assist in obstacle avoidance. For example, computer vision and/or depth sensing may be utilized to detect and/or avoid obstacles. For instance, trees, bridges (e.g., freeway overpasses), and/or other drones may interfere with the landing procedures (in the acquisition stage, the approach stage, and/or the landing stage). If the apparatus 102 detects an obstacle with computer vision (e.g., the computer vision tracker 110) and/or depth sensing (e.g., the distance determiner 116), the movement controller 114 may determine an avoidance path and control the movement of the drone to avoid the obstacle. After obstacle avoidance, the landing procedures may resume and/or may be restarted.

In some configurations, one or more landing procedures may be based on battery charge information. For example, the apparatus 102 and/or a remote electronic device may be powered by one or more batteries. For instance, a drone may include a battery and may detect a level of battery charge. If the battery charge level drops below a charge threshold, the drone may attempt to land for recharging. In some approaches, battery charge level may be utilized to prioritize landing among multiple drones. For example, a drone with a lowest battery charge may be permitted to land first, a drone with a second lowers battery charge may be permitted to land next, and so on. The drone or the remote electronic device may determine the priority based on one or more communicated battery levels.

In some configurations, the apparatus 102 (e.g., a drone, moving base, vehicle, landing pad, docking station, etc.) may communicate with a remote electronic device (e.g., a moving base, vehicle, landing pad, docking station, drone, etc.) via Wi-Fi. Once the Wi-Fi connection is established between the apparatus 102 and the remote electronic device (e.g., between a drone and a moving base, vehicle, landing pad, docking station, etc.), the apparatus 102 may communicate over Wi-Fi using JavaScript Object Notations (JSONs). A JSON is a data format that may be used for asynchronous communication (e.g., browser/server communication, client/server communication, drone/moving base communication, etc.).

In some configurations, one or more Wi-Fi JSONs may be utilized to check the availability of charging and/or check charging capability for a specific type of drone (e.g., make and model, specific type of battery, etc.). For example, a drone may send a JSON for determining whether charging is available at a moving base (e.g., vehicle, landing pad, landing pad slot, docking station, etc.) and/or for determining whether the charging at the moving base is compatible with the drone. For instance, the drone may send a JSON to a moving base to query whether the moving base provides charging. Additionally or alternatively, the drone may send an indication of the drone type (e.g., make and/or model) and/or of a charging type. The drone may then receive (from the moving base (e.g., landing pad, landing pad slot, docking station, etc.)) an indication of whether the charging is compatible. Other approaches may be utilized. For example, the moving base may send an indication of a type of charging provided. The drone may then determine whether the type of charging is compatible with the drone.

In some configurations, the drone (e.g., the apparatus 102 or a remote electronic device) may provide an indication of a battery charge state (e.g., percentage of charge remaining, an indicator that charging is needed, etc.). In some approaches, the drone may request an urgent landing if the battery is below a charge threshold (e.g., if the battery is under 15% charge capacity or another threshold, critically low, etc.). The moving base (e.g., landing pad, landing pad slot, docking station, etc.) may prioritize the incoming requests for landing station support based on the battery state.

In a more specific example, communication between a drone and a moving base (e.g., docking station) may proceed as follows. The drone and the moving base may establish a Wi-Fi connection between the drone and the moving base. The drone and moving base may communicate by sending and/or receiving one or more JSONs over Wi-Fi. An example of a JSON specification for a charging request, where the drone requests access to a drone charger for recharging the drone battery is given in Listing (1).

{"battery":[{"Model Name": "Parrot Bebop 2", "status": "Critical"}]}
Listing (1)

An example of a JSON response from the moving base (e.g., docking station on a vehicle) if battery charging is compatible (e.g., "found" in a memory of compatible charging types) is given in Listing (2).

Listing (2)

{
    "status": "success",
    "message": battery found
}

In some configurations, the moving base (e.g., docking station) may maintain an inventory of one or more charged batteries that may be used to replace one or more drone batteries. The drone and the moving base may communicate (with JSONs similar to those in Listing (1) and/or Listing (2), for example) to determine availability and/or compatibility. For example, the drone may indicate the battery type and the moving base may indicate whether the moving base has that type of battery. The battery replacement may be automated (e.g., the moving base, landing pad, landing pad slot, docking station, etc., may automatically replace the battery) or manual (e.g., a user may replace the battery).

It should be noted that one or more of the elements or components of the apparatus 102 may be combined and/or divided. For example, the image obtainer 118, the distance determiner 116, the computer vision tracker 110, and/or the movement controller 114 may be combined. Additionally or alternatively, one or more of the image obtainer 118, the distance determiner 116, the computer vision tracker 110, and/or the movement controller 114 may be divided into elements or components that perform a subset of the operations thereof. It should be noted that one or more of the elements or components of the processor 112 described in connection with FIG. 1 may optional. For example, the apparatus 102 may not include and/or may not implement one or more of the image obtainer 118, the distance determiner 116, the computer vision tracker 110, and/or the movement controller 114 in some configurations. In some implementations, the image obtainer 118, the distance determiner 116, the computer vision tracker 110, and/or the movement controller 114 may be implemented as independent circuitry (not as part of a processor, for example). In some configurations, a group of apparatuses (e.g., a drone swarm, group of vehicles, etc.) may coordinate to land one or more drones on one or more moving bases. For example, a set of apparatuses 102 may provide (e.g., send, transmit, etc.) coordinating information (e.g., image data, position information, depth information, operational information, etc.) to another apparatus 102 that may coordinate to land one or more drones (e.g., to schedule or prioritize drone landing, to avoid collision, etc.).

A more specific example of some configurations of the systems and methods disclosed herein is given as follows. The example refers to a drone and to a docking station on a moving base. The drone may be an example of the apparatus 102 and/or the docking station may be an example of the apparatus 102. The drone may utilize a frontal camera to capture frames (e.g., images for processing). The drone may convert one or more incoming frames (from RGB, for example) into HSV. The drone may filter out colors that are outside of a range. The drone may allocate memory for running one or more computer vision algorithms for detecting the docking station.

The drone may apply a smoothing algorithm to the frames. Smoothing the frames may reduce and/or remove noise. The drone may control jitter by computing a saliency score based on the objects in the input frame. The saliency score may be calculated for a frame based on the features of the objects in the frame. The saliency score may include the features of the whether the docking station is included in the frame. Noisy and/or jittery frames may have saliency values indicating that one or more objects in the frames do not match. The drone may apply smoothing filters these noisy and/or jittery frames. One or more frames where the noise level is still above a noise threshold (e.g., tolerance limit) may be discarded (e.g., not provided to the computer vision algorithms used for tracking).

The drone may track the docking station (e.g., the docking station on a vehicle, car, etc.). For example, the drone may use one or more computer vision algorithms for object detection and/or text recognition to locate (e.g., pinpoint) the docking station (e.g., drone charging station).

The drone may use a depth sensor (e.g., stereo cameras) to determine the distance between drone and the docking station. For example, depth sensor data may be used to calculate the distance between the docking station and the drone. Additionally or alternatively, the drone may obtain the x, y, and z coordinates of the docking station as a result of tracking. The coordinates may be used to calculate the distance.

The drone may check whether the drone is behind the docking station or ahead of the docking station. If the drone is behind the docking station and at a particular distance (e.g., greater than an acceleration distance threshold) from the docking station, the drone may accelerate until it is above the docking station (e.g., the entrance to the docking station). The acceleration of the drone is controlled by a control system that tracks the distance of the docking station using a depth sensor. Accordingly, the drone will continue to accelerate or decelerate until the drone has landed.

If the drone is ahead of the docking station, the drone may calculate distance differences between the drone and docking station using the depth sensor. The drone may decelerate until the drone is above the docking station (e.g., the entrance to the docking station). The drone may use object detection to detect the docking station and may land. In some configurations, the drone may perform enhanced (e.g., increased) tracking within a distance threshold of the docking station.

In some configurations, the drone may use optical flow for obstacle detection. For example, the drone may detect whether there an obstacle between the drone and the docking station and/or whether there is an obstacle in the drone's flight path. If an obstacle is detected, the drone may maneuver to avoid the obstacle.

The drone may check whether the docking station is unoccupied (e.g., free). The drone may land on or in a specific landing pad slot (e.g., specific landing station) in some configurations. It should be noted that one or more computer vision algorithms may be used to determine the occupancy of the landing station. For example, the drone may use one or more object detection algorithms and/or one or more machine learning algorithms to classify whether there are one or more objects on the docking station and to look for an unoccupied (e.g., empty) area of the docking station (e.g., landing pad slot). The drone may land and may receive an external signal from docking station (e.g., the landing pad and/or vehicle) to indicate that landing is complete.

It should be noted that one or more functions may be implemented from the perspective of a drone and/or from the perspective of a moving base (e.g., vehicle, landing pad, landing pad slot, docking station, etc.). For example, the apparatus 102 may be implemented on a moving base. The moving base may send information (e.g., control signals) to the drone for landing the drone. In some configurations, the moving base (e.g., vehicle) may know (e.g., determine and/or obtain) the position of the moving base. Based on the moving base position, the moving base may track and/or control the drone. For example, the drone may be an object that is being tracked by the moving base (e.g., computer vision tracker 110, computer vision algorithm(s), etc.). In an example from the perspective of the moving base, the drone tracking (and/or the moving base tracking by the drone) may be jittery. The moving base (e.g., vehicle) may provide extra information such as speed, acceleration and/or the position of drone from the perspective of the moving base. This may assist the drone in landing (e.g., improving landing). For example, drone tracking data from the moving base may be less jittery in some cases. Accordingly, controlling drone movements based on drone tracking data from the moving base may improve performance. Additionally or alternatively, using a combination of tracking data (e.g., moving base tracking data from the drone and drone tracking data from the moving base) may help to suppress noisy data (e.g., noisy frames, erroneous tracking estimates, etc.).

In some configurations, the moving base may provide moving base movement (e.g., velocity, heading, orientation, acceleration, deceleration, accelerometer, gyroscope, GPS, etc.) information to the drone. This may help the drone to suppress noisy data (e.g., noisy frames, erroneous tracking estimates, etc.) that are inconsistent with the moving base movement. It should be noted that one or more of the functions, operations, procedures, methods, examples, etc., disclosed herein from the perspective of a drone may be additionally or alternatively implemented from the perspective of the moving base and vice versa.

Figure 2:
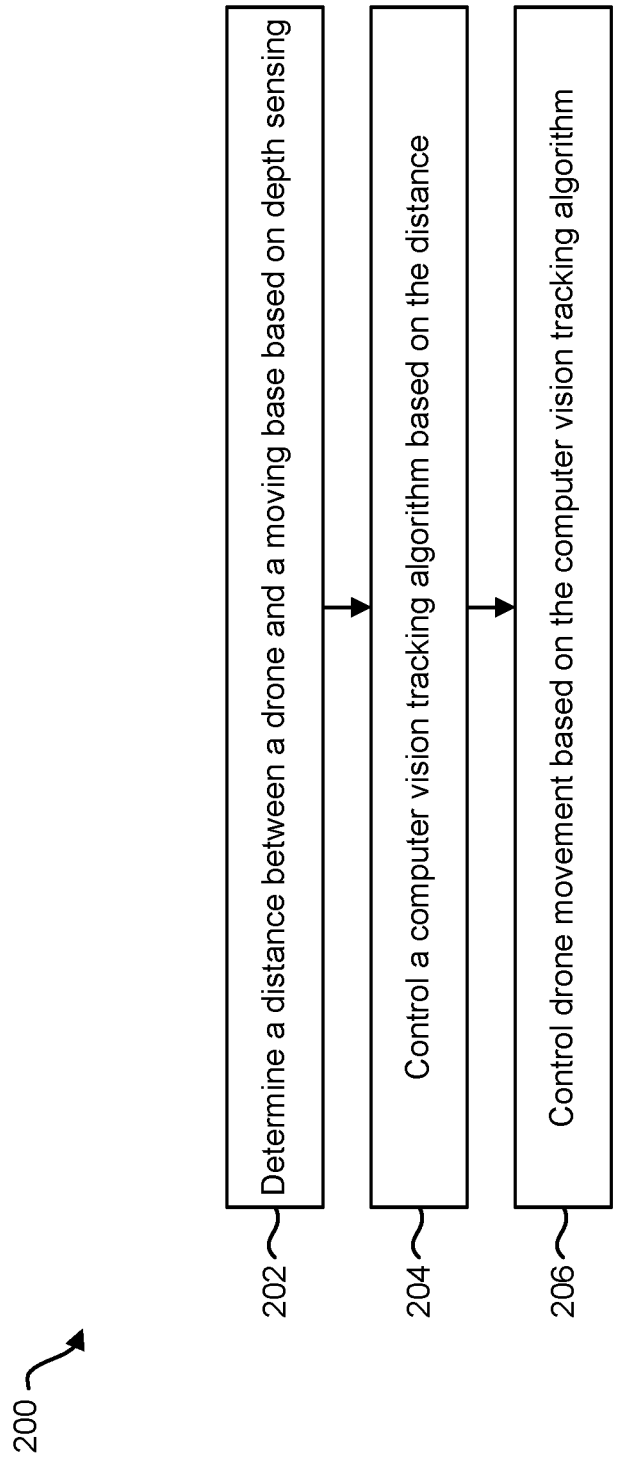
FIG. 2 is a flow diagram illustrating one configuration of a method for landing a drone on a moving base.

FIG. 2 is a flow diagram illustrating one configuration of a method 200 for landing a drone on a moving base. The method 200 may be performed by the apparatus 102 described in connection with FIG. 1. The apparatus 102 may determine 202 a distance between a drone and a moving base based on depth sensing. This may be accomplished as described in connection with FIG. 1. For example, the apparatus 102 may obtain depth information from one or more depth sensors and/or may determine 202 the distance between the drone and the moving base based on the depth information.

The apparatus 102 may control 204 a computer vision tracking algorithm based on the distance. This may be accomplished as described in connection with FIG. 1. For example, the apparatus 102 may increase tracking when the distance is within a distance threshold. In some configurations, the apparatus 102 may reduce tracking when the distance is not within a distance threshold. For example, if obstacle avoidance moves the drone outside of the distance threshold or the drone falls behind such that the drone is outside of the distance threshold, the apparatus 102 may reduce tracking (until the drone returns to within the distance threshold, for example).

The apparatus 102 may control 206 drone movement based on the computer vision tracking algorithm. This may be accomplished as described in connection with FIG. 1. For example, the apparatus 102 (e.g., processor 112) may cause the drone to accelerate if computer vision tracking indicates that the drone is behind the moving base (e.g., landing pad, landing pad slot, docking station, etc.). Or, the apparatus 102 (e.g., processor 112) may cause the drone to decelerate if computer vision tracking indicates that the drone is ahead of the moving base (e.g., landing pad, landing pad slot, docking station, etc.). In some configurations, controlling 206 drone movement may include driving one or more movement mechanisms (e.g., jets, propellers, etc.). In some configurations, controlling 206 drone movement may include sending movement information (e.g., movement commands) to the drone. For example, controlling 206 drone movement may include sending information for controlling drone movement based on the computer vision tracking algorithm.

Figure 3:
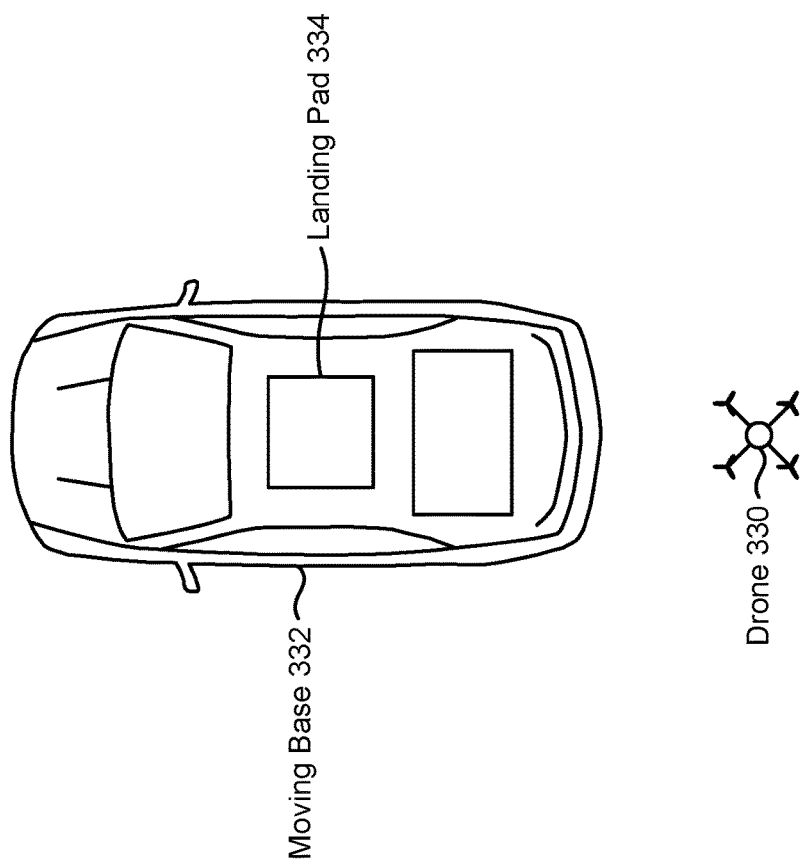
FIG. 3 is a diagram illustrating one example of a drone, a moving base, and a landing pad.

FIG. 3 is a diagram illustrating one example of a drone 330, a moving base 332, and a landing pad 334. In this example, the moving base 332 is a vehicle, with the landing pad 334 mounted on or integrated into the roof of the vehicle. It should be noted that a landing pad may be mounted and/or implemented in various configurations and/or arrangements on a moving base (e.g., vehicle). For example, a landing pad may be mounted in the top of the vehicle, on the roof of a vehicle, the back of a vehicle, on the side of a vehicle (e.g., on a door), on the front (e.g., hood) of a vehicle, underneath a vehicle, etc. The apparatus 102 described in connection with FIG. 1 may be implemented in the drone 330, in the moving base 332, or in another remote electronic device.

As described in connection with one or more of FIGS. 1 and 2, the apparatus 102 may utilize depth sensing and computer vision to land the drone 330 on the landing pad 334. In some configurations, the landing pad 334 may be marked with a symbol. The symbol may be detected and/or tracked by the apparatus to control drone 330 movement and/or to estimate a distance between the drone 330 and the landing pad 334. If the computer vision tracking algorithm indicates that the drone 330 is behind the landing pad 334, the apparatus may cause the drone 330 to accelerate towards the landing pad 334. If the computer vision tracking algorithm indicates that the drone 330 is behind the landing pad 334, the apparatus may cause the drone 330 to decelerate towards the landing pad 334.

As the drone approaches the landing pad 334, the apparatus may increase tracking when the drone 330 is within a distance threshold of the landing pad 334. This may increase tracking accuracy and enable a smooth landing.

Figure 4A:
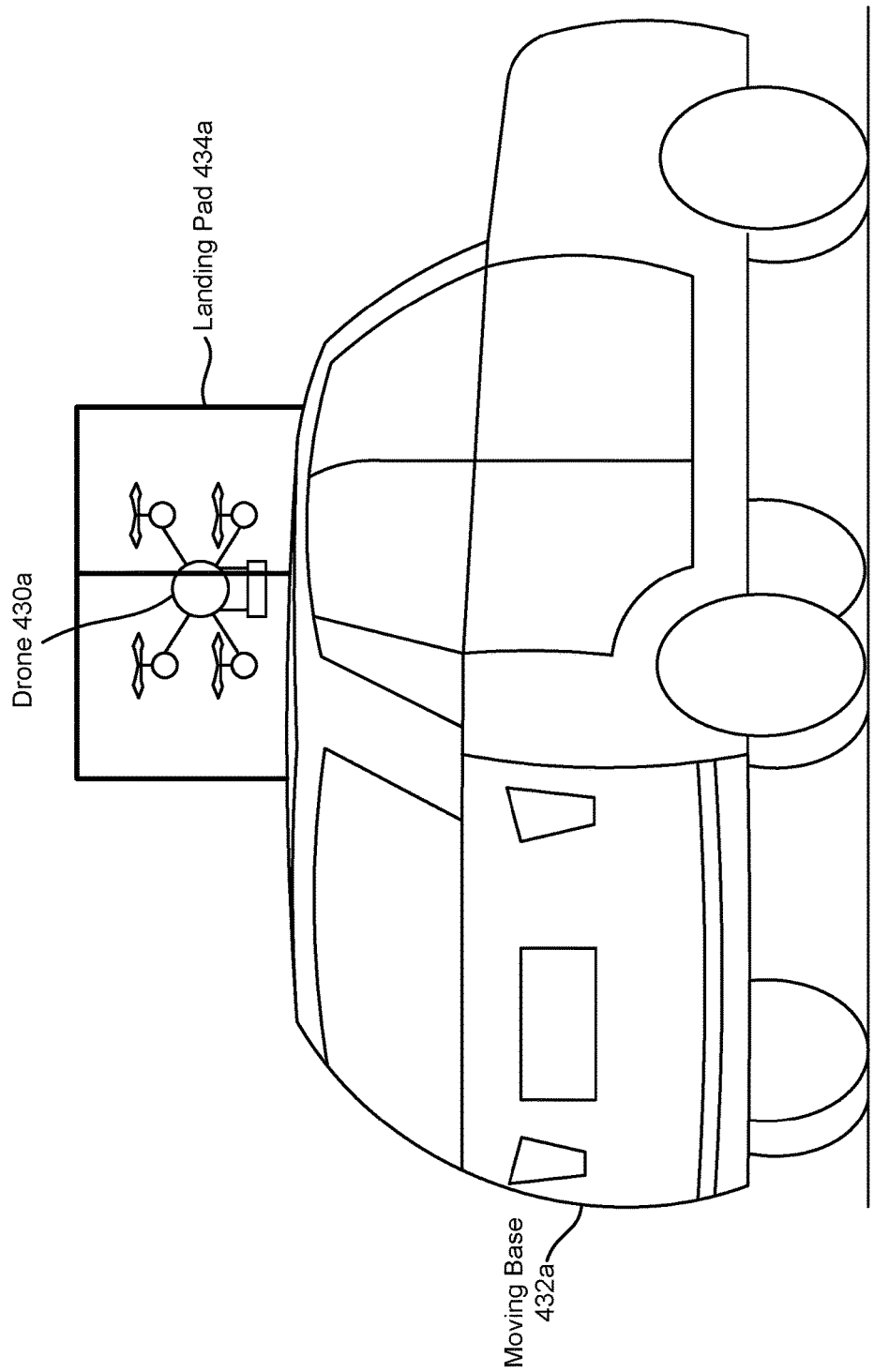
FIG. 4A is a diagram illustrating another example of a drone, a moving base, and a landing pad.

FIG. 4A is a diagram illustrating another example of a drone 430a, a moving base 432a, and a landing pad 434a. In this example, the moving base 432a is a vehicle, with the landing pad 434a mounted on or integrated into the roof of the vehicle. The apparatus 102 described in connection with FIG. 1 may be implemented in the drone 430a, in the moving base 432a, or in another remote electronic device.

A landing pad may be fully or partially enclosed in some configurations. In the example illustrated in FIG. 4A, the landing pad 434a includes an enclosure (e.g., sidewalls). A landing pad may be mounted and/or implemented in various configurations and/or arrangements on a moving base (e.g., vehicle). For example, a landing pad may be mounted on a roof of a vehicle. In other examples, a landing pad may be mounted on the back of a vehicle, on the side of a vehicle (e.g., on a door), on the front (e.g., hood) of a vehicle, underneath a vehicle, etc. In the example illustrated in FIG. 4A, the landing pad 434a is on the roof of the moving base.

In some configurations, a landing pad may provide access to the drone from within the vehicle. For example, a landing pad may be implemented with a door (e.g., trapdoor) mechanism that may be opened in order to access the drone (e.g., recover the drone, pull the drone into the vehicle, replace drone batteries, attach a package to the drone, etc.). In another example, the landing pad may be mounted next to a window, allowing access to the drone from within the vehicle. In another example, the landing pad may be integrated into the vehicle. For instance, a landing pad may include a mechanism (e.g., elevator, drawer, airlock mechanism, etc.) that may move the landing pad into the interior of the vehicle.

Figure 4B:
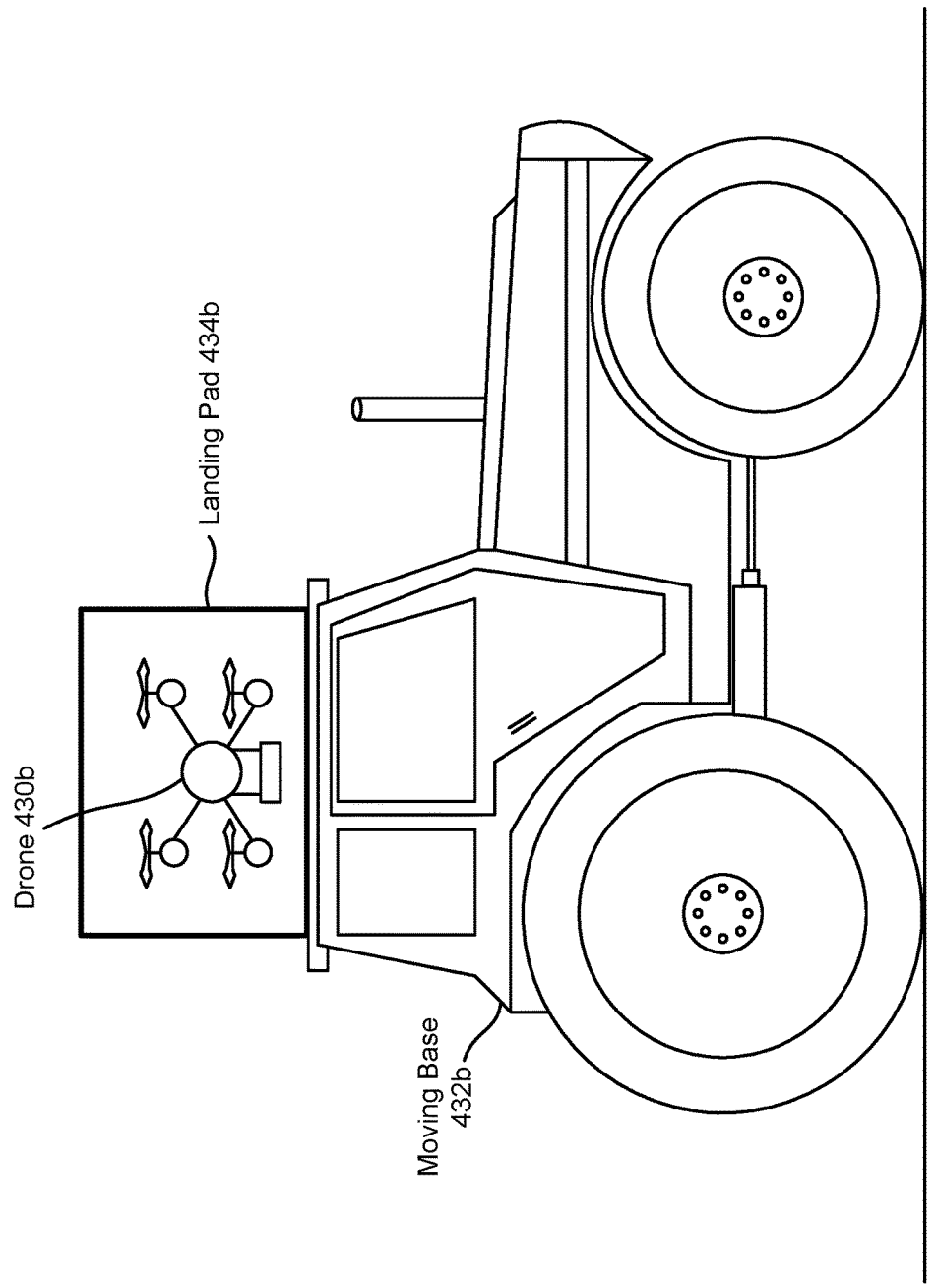
FIG. 4B is a diagram illustrating another example of a drone, a moving base, and a landing pad.

FIG. 4B is a diagram illustrating another example of a drone 430b, a moving base 432b, and a landing pad 434b. In this example, the moving base 432b is an agricultural vehicle (e.g., a tractor), with the landing pad 434b mounted on or integrated into the roof of the agricultural vehicle. The apparatus 102 described in connection with FIG. 1 may be implemented in the drone 430b, in the moving base 432b, or in another remote electronic device. In the example illustrated in FIG. 4B, the landing pad 434b includes an enclosure (e.g., sidewalls) and is on the roof of the moving base. It should be noted that a landing pad may be mounted and/or implemented in various configurations and/or arrangements on a moving base (e.g., vehicle). For example, the landing pad 434b may be mounted on a roof of an agricultural vehicle as illustrated in FIG. 4B. In other examples, a landing pad may be mounted on the back of the agricultural vehicle, on the side of the agricultural vehicle (e.g., on a door), on the front (e.g., hood) of the agricultural vehicle, underneath the agricultural vehicle, etc. For instance, a landing pad may be implemented at an opening in the back (of the cab, for example) of an agricultural vehicle, which may allow one or more drones to land. Accordingly, the landing pad may or may not be on the roof of a moving base in some configurations.

In some examples, the drone 430b may be utilized to scout agricultural work (e.g., areas for harvesting, areas for ploughing, areas for seeding, areas for fertilizing, areas for treating with pesticide, etc.). In some examples, the drone 430b may perform one or more functions, such as seeding, spreading fertilizer, spreading pesticide, etc.

Figure 5:
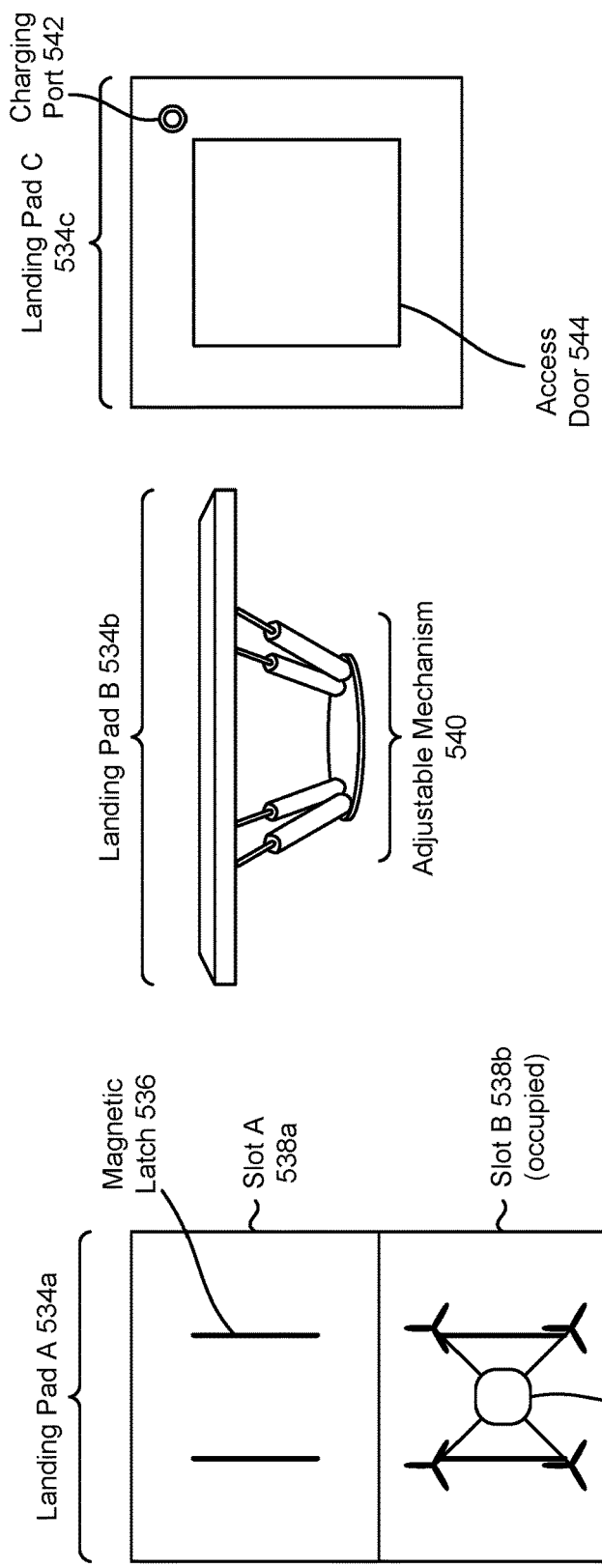
FIG. 5 is a diagram illustrating examples of landing pads.

FIG. 5 is a diagram illustrating examples of landing pads 534a-c. The examples of landing pads 534a-c in FIG. 5 illustrate some features that may be implemented in landing pads in accordance with some configurations of the systems and methods disclosed herein. For example, one or more of the landing pads 534a-c and/or one or more features of the landing pads 534a-c illustrated in FIG. 5 may be implemented on a moving base described in connection with FIG. 1. It should be noted that one or more landing pads may be mounted and/or implemented in various configurations and/or arrangements on a moving base (e.g., vehicle, car, truck, agricultural vehicle, drone, aircraft, train, drone, boat, bicycle, etc.). For example, a landing pad may be mounted in the top of the moving base, on the roof of the moving base, the back of the moving base, on the side of the moving base (e.g., on a door), on the front (e.g., hood) of the moving base, underneath the moving base, etc.

Landing pad A 534a may include multiple slots 538a-b. A slot may be a portion (e.g., region, zone, section, etc.) of a landing pad. Some landing pads may include two or more slots for accommodating multiple drones. In some configurations, slots may be separate landing pads. In this example, landing pad A 534a includes slot A 538a and slot B 538b. Slot B 538b is occupied by a drone 530. In some configurations of the systems and methods disclosed herein, a drone may determine whether one or more slots of a landing pad are occupied. For example, a drone may utilize computer vision to determine whether a slot is occupied by another drone. For instance, a drone may approach landing pad A 534a and may determine that slot B 538b is occupied due to the presence of the drone 530 in slot B 538b. Additionally or alternatively, the drone may determine that slot A 538a is unoccupied using computer vision. In some configurations, the drone may focus tracking on one or more unoccupied slots (e.g., slot A 538a) in order to land in an unoccupied slot. If the landing pad is completely occupied (e.g., each slot of the landing pad is occupied), the drone may abort landing and/or may send a message to a moving base (e.g., a vehicle) indicating that all slots are full.

Landing pad A 534a illustrates a magnetic latch 536. In some configurations, drones may include metallic (e.g., magnetic) landing gear (e.g., skids, steel rods, etc.). The magnetic latch 536 may attract and/or hold the drone to landing pad A 534a. For example, once the drone sits on landing pad A 534a (e.g., docking station), the magnetic latch 536 may hold the drone 530. This may ensure a firm contact between the drone 530 and landing pad A 534a (e.g., docking station). One or more messages (e.g., an interrupt using Wi-Fi JSONs) may be sent to the drone 530 to stop one or more computer vision algorithms. Other latching approaches may be implemented. For example, a landing pad may include mechanical latches, a closeable cover, hooks, etc., to latch a drone to the landing pad.

Landing pad B 534*b* illustrates an example of an adjustable mechanism 540. The adjustable mechanism 540 may allow landing pad B 534*b* to be adjusted. For example, the adjustable mechanism 540 may adjust the pitch, roll, yaw, height, etc. of landing pad B 534*b*. For example, an apparatus 102 may send an instruction to the adjustable mechanism 540 to approximately match the pitch, roll, and yaw of the drone. This may enable a smooth landing. For example, a drone may be pitched forward in order to keep up with a vehicle. The drone may send an instruction to the vehicle to adjust the landing pad to approximately match the forward pitch of the drone. This may allow smoother landing (e.g., mechanical engagement) of the drone on the landing pad.

Landing pads may include one or more additional or alternative features. For example, landing pad C 534*c* illustrates a charging port 542 and an access door 544. When landed, a drone may engage with the charging port 542 to charge one or more drone batteries. In other configurations, wireless charging (e.g., inductive charging) may be implemented to wirelessly charge the drone. Accordingly, a drone may charge on landing pad C 534*c* (e.g., in a drone charging station and/or in the drone docking station, etc.). As described herein, a drone may communicate with landing pad C 534*c* (or with a remote electronic device and/or a moving base that landing pad C 534*c* is attached to, etc.). For example, a drone and landing pad C 534*c* may exchange one or more JSONs in order to determine that the charging port 542 is available and/or compatible with the drone.

The access door 544 on landing pad C 534*c* may allow recovery of the drone or a package delivered by the drone. For example, once a drone has landed, the access door 544 may be opened to allow the drone to be recovered into the moving base (e.g., vehicle), may allow a package delivered by the drone to be recovered, may allow for battery recharging or replacement, and/or may allow for other drone maintenance to be performed, etc.

Figure 6:
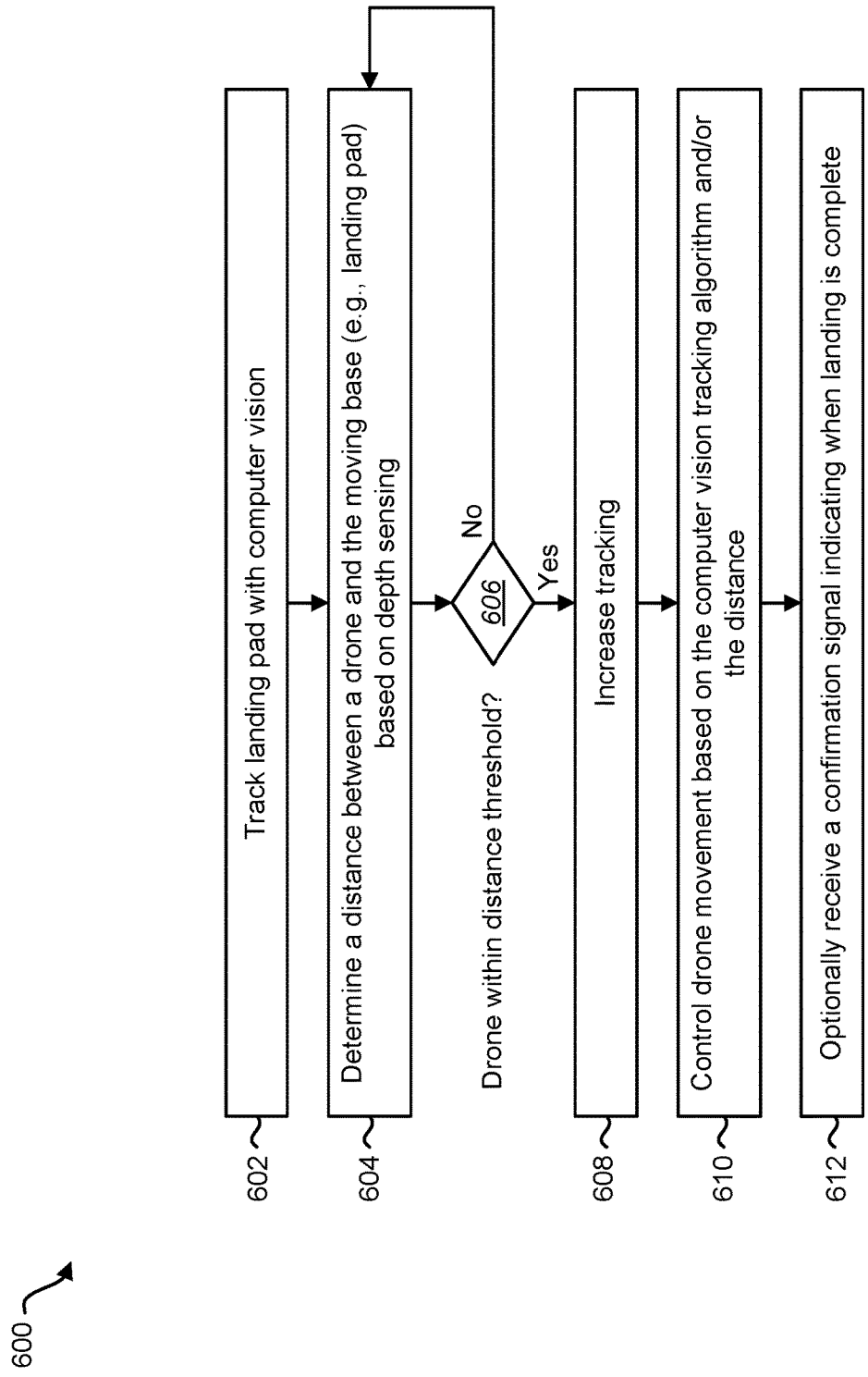
FIG. 6 is a flow diagram illustrating a more specific configuration of a method for landing a drone on a moving base.

FIG. 6 is a flow diagram illustrating a more specific configuration of a method 600 for landing a drone on a moving base. The method 600 may be performed by the apparatus 102 described in connection with FIG. 1. The apparatus 102 (e.g., drone, moving base, remote electronic device, etc.) may track 602 a landing pad with computer vision. This may be accomplished as described in connection with one or more of FIGS. 1-5. For example, the apparatus 102 may detect and/or track a landing pad in one or more images. In some configurations, the drone may provide the images with a frontal camera.

The apparatus 102 may determine 604 a distance between a drone and a moving base (e.g., landing pad) based on depth sensing. This may be accomplished as described in connection with one or more of FIGS. 1-3. For example, the apparatus 102 may obtain depth information from one or more depth sensors and/or may determine 604 the distance between the drone and the moving base based on the depth information.

The apparatus 102 may determine 606 whether the drone is within a distance threshold. This may be accomplished as described in connection with one or more of FIGS. 1-2. For example, the apparatus 102 may compare the distance with a distance threshold. If the drone is not within the distance threshold, the apparatus 102 may return to determining 604 an updated distance.

If the drone is within the distance threshold, the apparatus 102 may increase 608 tracking. This may be accomplished as described in connection with one or more of FIGS. 1-2. For example, the apparatus 102 may perform tracking on more frames and/or may track at an increased frame rate. Once the drone is within a distance threshold and/or decelerating with respect to the moving base (e.g., car, landing pad, landing pad slot, landing pad on top of the moving base, landing pad on the back of the moving base, landing pad on the side of the moving base, landing pad on the front of the moving base, etc.), faster tracking may be performed in order to ensure that the landing pad (e.g., landing pad slot, docking station, etc.) is not missed.

The apparatus 102 may control 610 drone movement based on the computer vision tracking algorithm and/or the distance. This may be accomplished as described in connection with one or more of FIGS. 1-5. For example, the apparatus 102 (e.g., processor 112) may cause the drone to accelerate, decelerate, or hold steady based on the location of the drone relative to the moving base (e.g., landing pad, landing pad slot, docking station, etc.) based on the computer vision tracking algorithm and/or the distance. In some configurations, depth estimation from drone camera images (indicating a distance between the drone camera and the landing pad, for example) may be utilized to land the drone, possible in combination with GPS.

The apparatus 102 may optionally receive 612 a confirmation signal indicating when landing is complete. For example, a remote device (e.g., drone, moving base, remote electronic device, the landing pad, etc.) may detect when landing is complete (e.g., when a latching mechanism is successfully engaged, when the drone is detected as landed, etc.) and may send a signal to the apparatus 102 indication completion of landing. Additionally or alternatively, the drone may be latched to a magnetic latch when landing. Latching the magnetic latch may trigger the communication. In some configurations, the drone (e.g., propelling mechanism(s), computer vision, etc.) may deactivate when landing is confirmed as complete.

Figure 7:
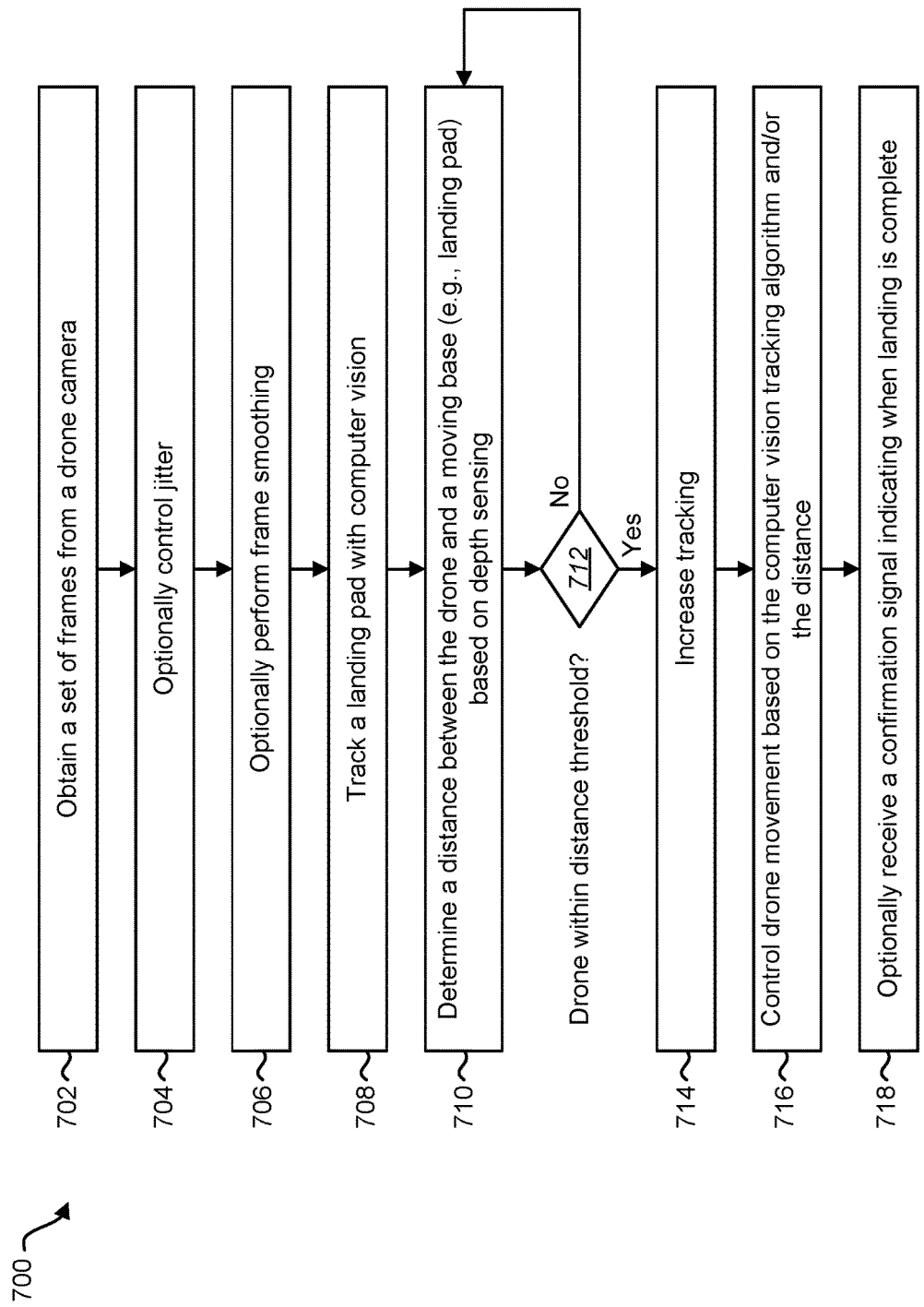
FIG. 7 is a flow diagram illustrating another more specific configuration of a method for landing a drone on a moving base.

FIG. 7 is a flow diagram illustrating another more specific configuration of a method 700 for landing a drone on a moving base. The method 700 may be performed by the apparatus 102 described in connection with FIG. 1. The apparatus 102 (e.g., drone, moving base, remote electronic device, etc.) may obtain 702 a set of frames from a drone camera. This may be accomplished as described in connection with FIG. 1. For example, the apparatus 102 may capture and/or receive frames (e.g., a sequence of frames, video, etc.) from one or more drone cameras.

The apparatus 102 may optionally control 704 jitter. This may be accomplished as described in connection with FIG. 1. For example, the apparatus 102 may convert an increased number of frames (e.g., frames at an increased framerate, an increased proportion of the set of frames, etc.) from one color space to another (e.g., from RGB to HSV). Additionally or alternatively, the apparatus 102 may screen one or more frames based on a saliency score.

The apparatus 102 may optionally perform 706 frame smoothing. This may be accomplished as described in connection with FIG. 1. For example, the apparatus 102 may perform 706 frame smoothing on a set of frames provided to the computer vision tracking algorithm. It should be noted that the set of frames provided to the computer vision tracking algorithm may be all or a subset of the set of frame from the drone camera.

The apparatus 102 may track 708 a landing pad with computer vision. This may be accomplished as described in connection with one or more of FIGS. 1-6.

The apparatus 102 may determine 710 a distance between a drone and a moving base (e.g., landing pad) based on depth sensing. This may be accomplished as described in connection with one or more of FIGS. 1-3 and 6.

The apparatus 102 may determine 712 whether the drone is within a distance threshold. This may be accomplished as described in connection with one or more of FIGS. 1-2 and 6. If the drone is not within the distance threshold, the apparatus 102 may return to determining 710 an updated distance.

If the drone is within the distance threshold, the apparatus 102 may increase 714 tracking. This may be accomplished as described in connection with one or more of FIGS. 1-2 and 6.

The apparatus 102 may control 716 drone movement based on the computer vision tracking algorithm and/or the distance. This may be accomplished as described in connection with one or more of FIGS. 1-6.

The apparatus 102 may optionally receive 718 a confirmation signal indicating when landing is complete. This may be accomplished as described in connection with FIG. 6. For example, the drone may be latched to the moving base (e.g., landing pad, landing pad slot, docking station, etc.) and one or more computer vision algorithms may be ended after the drone has landed. In some configurations, the confirmation signal may indicate a command to stop one or more computer vision algorithms.

Figure 8:
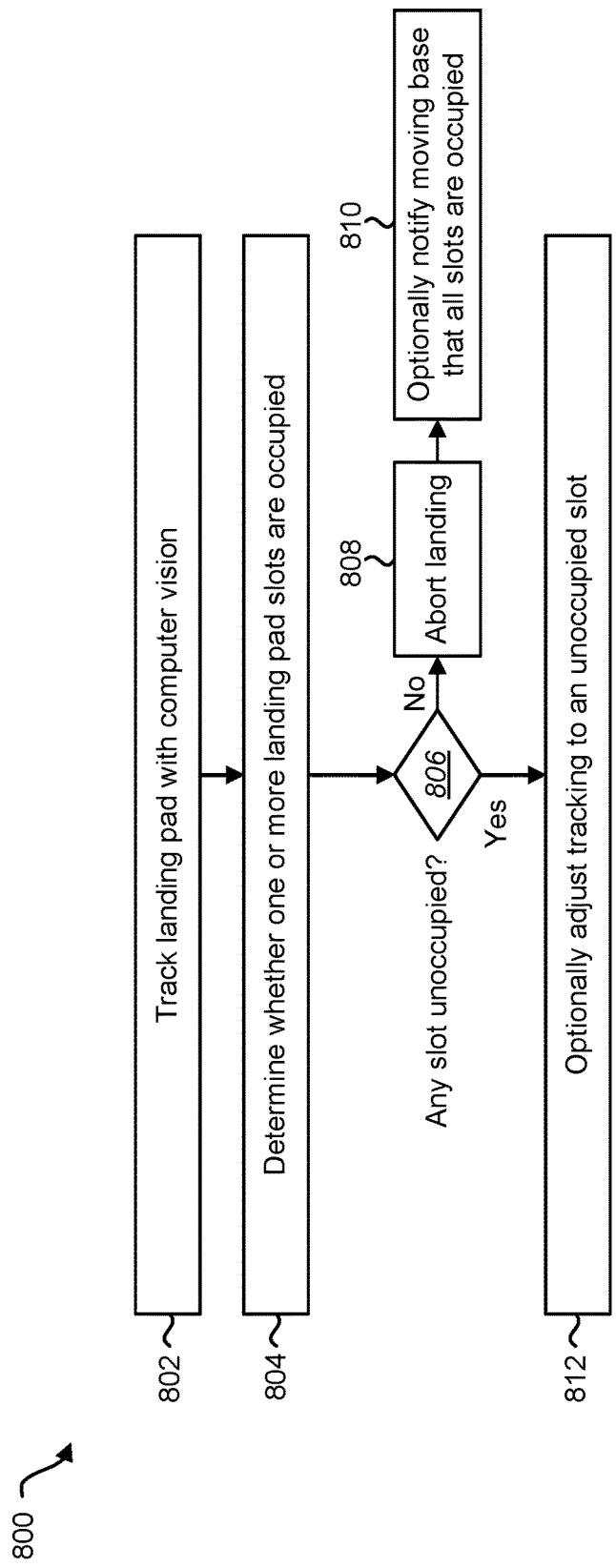
FIG. 8 is a flow diagram illustrating one configuration of a method for determining slot occupancy.

FIG. 8 is a flow diagram illustrating one configuration of a method 800 for determining slot occupancy. The method 800 may be performed by the apparatus 102 described in connection with FIG. 1 and/or may be performed in conjunction with one or more of the methods 200, 600, 700 described herein. The apparatus 102 may track 802 a landing pad with computer vision. This may be accomplished as described in connection with one or more of FIGS. 1-7.

The apparatus 102 may determine 804 whether one or more landing pad slots are occupied. This may be accomplished as described in connection with one or more of FIGS. 1 and 5. For example, the apparatus 102 may detect a drone in one or more landing pad slots with computer vision.

The apparatus 102 may determine 806 whether any landing pad slot is unoccupied. This may be accomplished as described in connection with one or more of FIGS. 1 and 5. For example, the apparatus 102 may determine the number of landing pad slots on a moving base and may determine whether a drone is not detected in any of the landing pad slots. If a landing pad slot is unoccupied, the apparatus 102 may optionally adjust 812 tracking to an unoccupied slot. For example, the apparatus 102 may track the unoccupied landing pad slot and discontinue tracking one or more occupied landing pad slots. In some configurations, the drone may continue landing procedures for the unoccupied landing pad slot.

If none of the landing pad slots are unoccupied (e.g., if all of the landing pad slots are occupied), the apparatus 102 may abort 808 landing. For example, the apparatus 102 may stop landing procedures by the drone. This may be accomplished as described in connection with one or more of FIGS. 1 and 5. The apparatus 102 may optionally notify 810 the moving base that all landing pad slots are occupied. For example, the apparatus 102 may generate and/or send an indicator (e.g., a signal) that indicates that all landing pad slots are occupied. In some configurations, one or more occupying drones may determine or may be commanded to launch in order to clear a landing pad slot.

Figure 9:
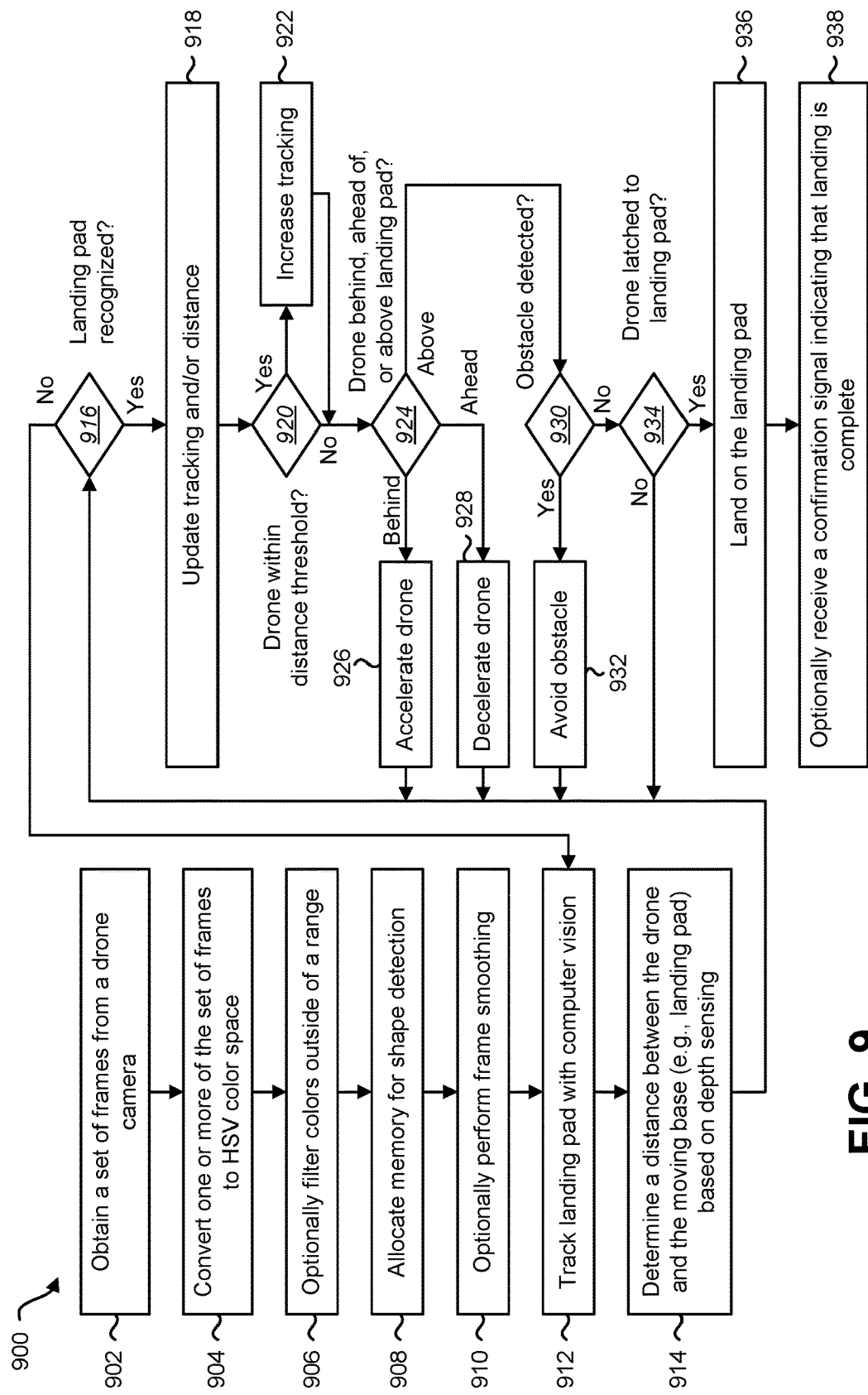
FIG. 9 is a flow diagram illustrating another more specific configuration of a method for landing a drone on a moving base.

FIG. 9 is a flow diagram illustrating another more specific configuration of a method 900 for landing a drone on a moving base. The method 900 may be performed by the apparatus 102 described in connection with FIG. 1. The apparatus 102 (e.g., drone, moving base, remote electronic device, etc.) may obtain 902 a set of frames from a drone camera. This may be accomplished as described in connection with one or more of FIGS. 1 and 7. For example, the drone may provide frames from a frontal camera.

The apparatus 102 may convert 904 one or more of the set of frames to an HSV color space. This may be accomplished as described in connection with one or more of FIGS. 1 and 7. In some approaches, an increased number of frames may be converted when the drone is within a threshold distance (e.g., the distance threshold or another threshold).

The apparatus 102 may optionally filter 906 color outside of a range. This may be accomplished as described in connection with FIG. 1. For example, the apparatus may reduce, suppress, or remove one or more colors that are outside of a range.

The apparatus 102 may allocate 908 memory for shape detection. For example, the apparatus 102 may allocate 908 memory for executing the computer vision algorithms. For instance, memory may be allocated by an operating system loaded on a drone.

The apparatus 102 may optionally perform 910 frame smoothing. This may be accomplished as described in connection with one or more of FIGS. 1 and 7. For example, the apparatus 102 may apply a smoothing algorithm to one or more of the set of frames.

The apparatus 102 may track 912 a landing pad with computer vision. This may be accomplished as described in connection with one or more of FIGS. 1-7. For example, the apparatus 102 may use one or more computer vision algorithms for landing pad detection and text recognition to locate (e.g., pinpoint) the landing pad (e.g., drone charging station).

The apparatus 102 may determine 914 a distance between a drone and a moving base (e.g., landing pad) based on depth sensing. This may be accomplished as described in connection with one or more of FIGS. 1-3 and 6-7. For example, the apparatus 102 may utilize a depth sensor (e.g., stereoscopic cameras) to determine the distance between the drone and the landing pad (e.g., docking station, charging station on a vehicle, etc.).

The apparatus 102 may determine 916 whether the landing pad (e.g., landing pad slot, docking station, etc.) is recognized. For example, the apparatus 102 may determine 916 whether the landing pad or marking on the landing pad is recognized in one or more images. In some configurations, the computer vision tracking algorithm may provide a tracking score that indicates a likelihood or probability that the landing pad (e.g., landing pad slot, docking station, etc.) is tracked (e.g., that the landing pad is within an identified region of interest or bounding box). The apparatus 102 may compare the tracking score to a tracking threshold. If the tracking score is greater than the tracking threshold, the apparatus 102 may determine 916 that the landing pad is recognized. Otherwise, the apparatus 102 may determine 916 that the landing pad is not recognized. Additionally or alternatively, the apparatus 102 may perform object recognition within a tracked region of interest or tracked bounding box. If a resulting recognition score is greater than a recognition threshold, the apparatus 102 may determine that the landing pad is recognized (and not recognized otherwise). If the landing pad is not recognized, the apparatus 102 may return to tracking 912 the landing pad with computer vision.

If the landing pad is recognized, the apparatus 102 may update 918 tracking and/or the distance. For example, the apparatus 102 may calculate the distance between the drone and the moving base (e.g., drone and car, drone and landing pad on the moving base, etc.). This may be accomplished using depth information (from a depth sensor) as described above. Additionally or alternatively, the apparatus 102 may determine (e.g., calculate) 3D coordinates (e.g., x, y, z coordinates) of the landing pad (e.g., landing pad slot(s)) as a result of tracking. The 3D coordinates may be utilized to calculate the distance. Additionally or alternatively, the apparatus 102 may calculate GPS coordinate differences between the drone and the landing pad (e.g., landing pad slot, docking station, etc.).

The apparatus 102 may determine 920 whether the drone is within a distance threshold. This may be accomplished as described in connection with one or more of FIGS. 1-2 and 6-7. If the drone is within the distance threshold, the apparatus 102 may increase 922 tracking. This may be accomplished as described in connection with one or more of FIGS. 1-2 and 6-7.

The apparatus 102 may determine 924 whether the drone is behind, ahead of, or above the landing pad (e.g., docking entrance). This may be accomplished as described in connection with one or more of FIGS. 1-2. For example, the computer vision tracking algorithm may indicate whether the landing pad is in a part of one or more images that corresponds to the front of the drone, the rear of the drone, or under the drone. It should be noted that there may be a range within which the drone is considered to be above the landing pad. For example, the drone may or may not be precisely above a vertical axis relative to the landing pad. The drone may be considered to be above the landing pad within a range around the vertical axis.

If the drone is behind the landing pad, the apparatus 102 may accelerate 926 the drone. For example, the apparatus 102 may control one or more movement mechanisms (e.g., propellers, thrusters, etc.) to accelerate the movement of the drone towards the landing pad. In some configurations, the apparatus 102 may be the drone and may directly control the movement mechanism(s). In other configurations, the apparatus 102 may be a remote electronic device (e.g., a moving base, vehicle, other remote device, etc.) and may send instructions and/or commands to the drone to accelerate towards the landing pad. The apparatus 102 may return to determining 916 whether the landing pad is recognized.

If the drone is ahead of the landing pad, the apparatus 102 may decelerate 928 the drone. For example, the apparatus 102 may control one or more movement mechanisms (e.g., propellers, thrusters, etc.) to decelerate the movement of the drone towards the landing pad. In some configurations, the apparatus 102 may be the drone and may directly control the movement mechanism(s). In other configurations, the apparatus 102 may be a remote electronic device (e.g., a moving base, vehicle, other remote device, etc.) and may send instructions and/or commands to the drone to decelerate towards the landing pad. The apparatus 102 may return to determining 916 whether the landing pad is recognized. As can be observed, the apparatus 102 may accelerate and/or decelerate the drone until it is above the landing pad. When the drone is above the landing pad, the apparatus 102 may cause the drone descend onto the landing pad. For example, the apparatus 102 may control the drone to lower height or altitude in order to touch down on the landing pad and/or to align with landing pad latches (e.g., magnetic latches, mechanical latches, etc.). Additionally or alternatively, the drone descent may be performed as part of accelerating or decelerating towards the landing pad.

If the drone is above the landing pad, the apparatus 102 may determine 930 whether an obstacle is detected. This may be accomplished as described in connection with one or more of FIGS. 1-2. For example, the computer vision tracking algorithm may determine whether the drone may collide with an obstacle in the current path. In some configurations, the apparatus 102 may determine whether there is an obstacle between the drone and the landing pad (e.g., landing pad slot, docking station, etc.). Optical flow may be utilized for obstacle detection in some configurations.

If an obstacle is detected, the apparatus 102 may cause the drone to avoid 932 the obstacle. For example, the apparatus 102 may control the drone to take evasive maneuvers (e.g., to plan a path around the obstacle and follow the path). In some configurations, the apparatus 102 may perform object tracking (e.g., optical flow) on the obstacle to keep the drone from colliding with the obstacle. The apparatus 102 may return to determining 916 whether the landing pad is recognized.

If no obstacle is detected, the apparatus 102 may determine 934 whether the drone is latched to the landing pad (e.g., landing pad slot, docking station, etc.). In some configurations, the apparatus 102 may detect that the drone is latched (by detecting a change in the electromagnetic field of the landing gear or skids for magnetic latches, and/or by receiving a signal indicating latching, for example). If the drone is not latched to the landing pad, the apparatus 102 may return to determining 916 whether the landing pad is recognized.

If the drone is latched to the landing pad, cause the drone to land 936 on the landing pad. For example, the drone may deactivate one or more movement mechanisms (e.g., may stop propellers and/or thrusters).

The apparatus 102 may optionally receive 938 a confirmation signal indicating when landing is complete. This may be accomplished as described in connection with one or more of FIGS. 6-7. For example, the drone may receive a signal from the moving base (e.g., vehicle) indicating that landing is complete.

Figure 10:
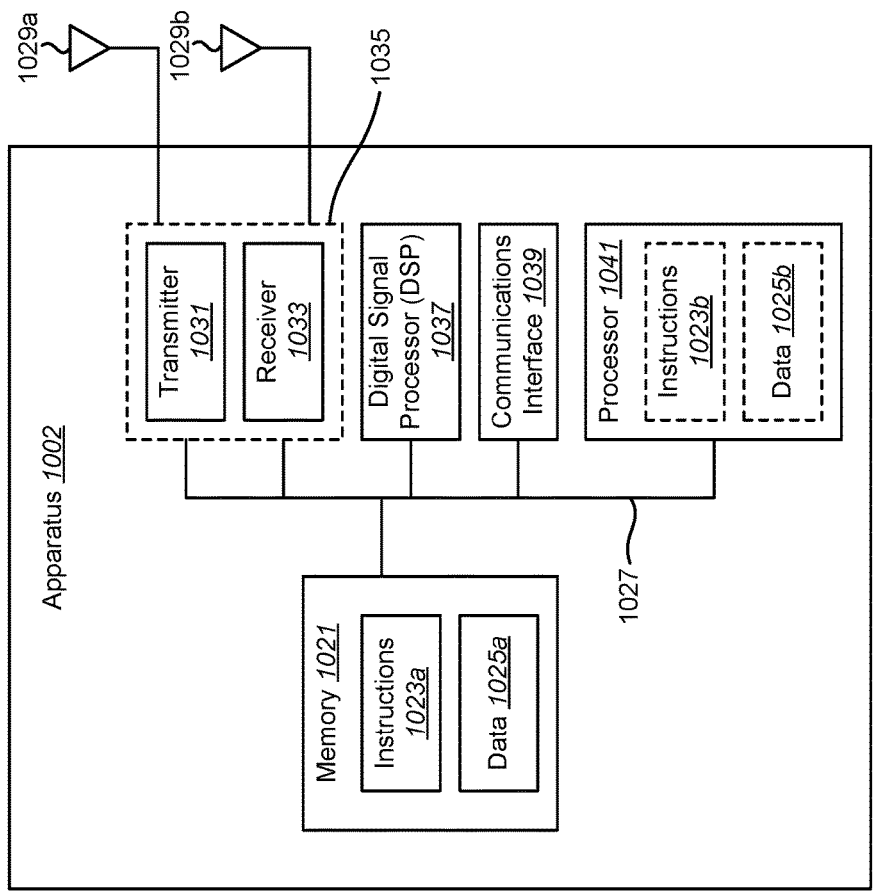
FIG. 10 illustrates certain components that may be included within an apparatus configured to implement various configurations of the systems and methods disclosed herein.

FIG. 10 illustrates certain components that may be included within an apparatus 1002 configured to implement various configurations of the systems and methods disclosed herein. Examples of the apparatus 1002 may include cameras, video camcorders, digital cameras, cellular phones, smart phones, computers (e.g., desktop computers, laptop computers, etc.), tablet devices, media players, televisions, vehicles, automobiles, personal cameras, wearable cameras, virtual reality devices (e.g., headsets), augmented reality devices (e.g., headsets), mixed reality devices (e.g., headsets), action cameras, surveillance cameras, mounted cameras, connected cameras, robots, aircraft, drones, unmanned aerial vehicles (UAVs), smart appliances, healthcare equipment, gaming consoles, personal digital assistants (PDAs), set-top boxes, etc. The apparatus 1002 may be implemented in accordance with the apparatus 102, one or more moving bases 332, 432a, 432b, and/or drones 330, 430, 530, etc., described herein.

The apparatus 1002 includes a processor 1041. The processor 1041 may be a general purpose single- or multi-chip microprocessor (e.g., an ARM), a special purpose microprocessor (e.g., a digital signal processor (DSP), image signal processor (ISP), etc.), a microcontroller, a programmable gate array, etc. The processor 1041 may be referred to as a central processing unit (CPU). Although just a single processor 1041 is shown in the apparatus 1002, in an alternative configuration, a combination of processors (e.g., an ARM and DSP) could be implemented.

The apparatus 1002 also includes memory 1021. The memory 1021 may be any electronic component capable of storing electronic information. The memory 1021 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1025*a* and instructions 1023*a* may be stored in the memory 1021. The instructions 1023*a* may be executable by the processor 1041 to implement one or more of the methods 200, 600, 700, 800, 900, procedures, steps, and/or functions described herein. Executing the instructions 1023*a* may involve the use of the data 1025*a* that is stored in the memory 1021. When the processor 1041 executes the instructions 1023, various portions of the instructions 1023*b* may be loaded onto the processor 1041 and/or various pieces of data 1025*b* may be loaded onto the processor 1041.

The apparatus 1002 may also include a transmitter 1031 and/or a receiver 1033 to allow transmission and reception of signals to and from the apparatus 1002. The transmitter 1031 and receiver 1033 may be collectively referred to as a transceiver 1035. One or more antennas 1029*a*-*b* may be electrically coupled to the transceiver 1035. The apparatus 1002 may also include (not shown) multiple transmitters, multiple receivers, multiple transceivers and/or additional antennas.

The apparatus 1002 may include a digital signal processor (DSP) 1037. The apparatus 1002 may also include a communications interface 1039. The communications interface 1039 may allow and/or enable one or more kinds of input and/or output. For example, the communications interface 1039 may include one or more ports and/or communication devices for linking other devices to the apparatus 1002. In some configurations, the communications interface 1039 may include the transmitter 1031, the receiver 1033, or both (e.g., the transceiver 1035). Additionally or alternatively, the communications interface 1039 may include one or more other interfaces (e.g., touchscreen, keypad, keyboard, microphone, camera, etc.). For example, the communication interface 1039 may enable a user to interact with the apparatus 1002.

The various components of the apparatus 1002 may be coupled together by one or more buses, which may include a power bus, a control signal bus, a status signal bus, a data bus, etc. For the sake of clarity, the various buses are illustrated in FIG. 10 as a bus system 1027.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A drone, comprising:
   a depth sensor configured to provide information for determining a distance between the drone and a moving base; and
   a processor configured to control a computer vision tracking algorithm by increasing tracking when the distance is within a distance threshold and to control drone movement based on the computer vision tracking algorithm.

2. The drone of claim 1, wherein the processor is configured to control jitter of the computer vision tracking algorithm.

3. The drone of claim 2, wherein the processor is configured to control the jitter by converting an increased number of red-green-blue (RGB) frames to hue-saturation-value (HSV) frames.

4. The drone of claim 2, wherein the processor is configured to control the jitter by:
   computing a saliency score based on a model and at least a portion of a frame;
   determining whether the frame is a valid frame for tracking based on the saliency score; and
   providing the frame to the computer vision tracking algorithm in a case that the frame is a valid frame.

5. The drone of claim 1, wherein the processor is configured to perform frame smoothing on a set of frames provided to the computer vision tracking algorithm.

6. The drone of claim 1, wherein the processor is configured to control drone movement by controlling drone acceleration, using one or more movement mechanisms, based on the computer vision tracking algorithm.

7. The drone of claim 1, wherein the processor is configured to perform obstacle detection using at least one of computer vision or depth sensing, and wherein the processor is configured to control drone movement by changing drone trajectory to avoid an obstacle using one or more movement mechanisms.

8. The drone of claim 1, wherein the processor is configured to determine whether one or more slots on the moving base are occupied.

9. The drone of claim 1, wherein the processor is configured to provide information for controlling an adjustable landing pad on the moving base.

10. A method performed by a drone, comprising:
    determining a distance between the drone and a moving base;
    controlling a computer vision tracking algorithm, comprising increasing tracking when the distance is within a distance threshold; and
    controlling drone movement based on the computer vision tracking algorithm.

11. The method of claim 10, further comprising controlling jitter of the computer vision tracking algorithm.

12. The method of claim 10, further comprising determining whether one or more slots on the moving base are occupied.

13. The method of claim 10, further comprising providing information for controlling an adjustable landing pad on the moving base.

14. A vehicle, comprising:
    a depth sensor configured to provide information for determining a distance between a drone and the vehicle; and
    a processor configured to control a computer vision tracking algorithm by increasing tracking when the distance is within a distance threshold and to send information for controlling drone movement based on the computer vision tracking algorithm.

15. The vehicle of claim 14, wherein the processor is configured to control jitter of the computer vision tracking algorithm.

16. The vehicle of claim 15, wherein the processor is configured to control the jitter by converting an increased number of red-green-blue (RGB) frames to hue-saturation-value (HSV) frames.

17. The vehicle of claim 15, wherein the processor is configured to control the jitter by:
    computing a saliency score based on a model and at least a portion of a frame;
    determining whether the frame is a valid frame for tracking based on the saliency score; and
    providing the frame to the computer vision tracking algorithm in a case that the frame is a valid frame.

18. The vehicle of claim 14, wherein the information includes drone position information and drone movement information determined by the vehicle based on the computer vision tracking algorithm.

19. The vehicle of claim 14, wherein the processor is configured to control drone movement by controlling drone acceleration, using one or more movement mechanisms, based on the computer vision tracking algorithm.

20. The vehicle of claim 14, wherein the processor is configured to perform obstacle detection using at least one of computer vision or depth sensing, and wherein the processor is configured to control drone movement by changing drone trajectory to avoid an obstacle using one or more movement mechanisms.

21. The vehicle of claim 14, wherein the processor is configured to determine whether one or more slots on the vehicle are occupied.

22. The vehicle of claim 14, wherein the processor is configured to control an adjustable landing pad on the vehicle using an adjustable mechanism based on the computer vision tracking algorithm.

23. A method performed by a vehicle, comprising:
determining a distance between a drone and the vehicle;
controlling a computer vision tracking algorithm, comprising increasing tracking when the distance is within a distance threshold; and
controlling drone movement based on the computer vision tracking algorithm.

24. The method of claim 23, wherein controlling the drone movement is based on drone position information and drone movement information determined by the vehicle based on the computer vision tracking algorithm.

25. The method of claim 23, further comprising determining whether one or more slots on the vehicle are occupied.

26. The method of claim 23, further comprising controlling an adjustable landing pad on the vehicle based on the computer vision tracking algorithm.

* * * * *